United States Patent
Miao et al.

(10) Patent No.: US 11,816,754 B2
(45) Date of Patent: Nov. 14, 2023

(54) MEASUREMENT PARAMETER OPTIMIZATION METHOD AND DEVICE, AND COMPUTER CONTROL PROGRAM STORED ON COMPUTER-READABLE STORAGE MEDIUM

(71) Applicant: OMRON Corporation, Kyoto (JP)

(72) Inventors: Lin Miao, Higashiosaka (JP); Xingdou Fu, Kizugawa (JP)

(73) Assignee: OMRON CORPORATION, Kyoto (JP)

( * ) Notice: Subject to any disclaimer, the term of this patent is extended or adjusted under 35 U.S.C. 154(b) by 506 days.

(21) Appl. No.: 17/172,105

(22) Filed: Feb. 10, 2021

(65) Prior Publication Data

US 2021/0283782 A1 Sep. 16, 2021

(30) Foreign Application Priority Data

Mar. 13, 2020 (JP) .................................. 2020-044682
Jun. 4, 2020 (JP) .................................. 2020-097760

(51) Int. Cl.
*G06T 1/00* (2006.01)
*B25J 9/16* (2006.01)
(Continued)

(52) U.S. Cl.
CPC ........... *G06T 1/0007* (2013.01); *B25J 9/1697* (2013.01); *G06T 1/0014* (2013.01);
(Continued)

(58) Field of Classification Search
CPC ... G06T 1/0007; G06T 1/0014; G06T 7/0004; G06T 7/20; G06T 7/70;
(Continued)

(56) References Cited

U.S. PATENT DOCUMENTS

2015/0294496 A1 10/2015 Medasani et al.
2017/0072566 A1 3/2017 Murata
(Continued)

FOREIGN PATENT DOCUMENTS

CN 102421279 A 4/2012
CN 105286893 A 2/2016
(Continued)

OTHER PUBLICATIONS

German Office Action dated Jun. 7, 2022 in a counterpart German patent application.
(Continued)

*Primary Examiner* — Abby Y Lin
*Assistant Examiner* — Esvinder Singh
(74) *Attorney, Agent, or Firm* — METROLEX IP LAW GROUP, PLLC

(57) ABSTRACT

A measurement parameter for use when measuring an object with a measuring device provided on a robot may be adjusted and optimized significantly more easily than in conventional technology. A measurement parameter optimization method or operations performed by a processor may include: acquiring N captured images of objects with first measurement parameters; estimating recognized object counts $Z_i$ for the objects based on acquiring $N/j$ captured images of the objects with second measurement parameters, and storing the recognized object counts $Z_i$ as first data; based on acquiring $N/j/k$ captured images of the objects with third measurement parameters, estimating recognized object counts $Z_i$ for the objects based on the first data and storing the recognized object counts $Z_i$ as second data; and determining an optimized measurement parameter that satisfies a predetermined judgment criterion from among the second data.

20 Claims, 19 Drawing Sheets

(51) Int. Cl.
*G06T 7/00* (2017.01)
*G06T 7/20* (2017.01)
*G06T 7/70* (2017.01)
*G06V 20/10* (2022.01)
*G06V 10/771* (2022.01)

(52) U.S. Cl.
CPC .............. *G06T 7/0004* (2013.01); *G06T 7/20* (2013.01); *G06T 7/70* (2017.01); *G06V 10/771* (2022.01); *G06V 20/10* (2022.01); *G05B 2219/50391* (2013.01); *G06T 2207/30164* (2013.01); *G06T 2207/30242* (2013.01)

(58) Field of Classification Search
CPC . G06T 2207/30164; G06T 2207/30242; G06T 7/80; G06T 7/97; B25J 9/1697; B25J 9/1651; B25J 9/1602; B25J 19/0095; B25J 9/1628; B25J 9/1653; B25J 9/1679; B25J 11/0095; B25J 19/021; B25J 19/023; G06V 10/771; G06V 20/10; G05B 2219/50391; G05B 2219/37555; G05B 2219/23399; G05B 2219/25065; G05B 2219/25124; G05B 2219/25365; G05B 2219/31103; G05B 2219/31104; G05B 2219/34455; G05B 2219/39412; G05B 2219/40527
See application file for complete search history.

(56) References Cited

U.S. PATENT DOCUMENTS

| | | |
|---|---|---|
| 2017/0252924 A1 | 9/2017 | Vijayanarasimhan et al. |
| 2018/0147723 A1 | 5/2018 | Vijayanarasimhan et al. |
| 2019/0025849 A1* | 1/2019 | Dean .................... G02B 26/105 |
| 2019/0279351 A1 | 9/2019 | Kato et al. |
| 2019/0285406 A1 | 9/2019 | Hazeyama |
| 2020/0215686 A1 | 7/2020 | Vijayanarasimhan et al. |
| 2021/0362338 A1 | 11/2021 | Rhim et al. |

FOREIGN PATENT DOCUMENTS

| | | |
|---|---|---|
| CN | 110261385 A | 9/2019 |
| CN | 110274538 A | 9/2019 |
| DE | 10 2008 020 579 B4 | 7/2014 |
| DE | 10 2014 106 210 B4 | 12/2015 |
| DE | 20 2017 106 506 U1 | 4/2018 |
| DE | 10 2019 206 444 A1 | 11/2020 |
| EP | 6587044 A1 | 1/2020 |
| JP | 2005-017286 A | 1/2005 |
| JP | 2017-56546 A | 3/2017 |
| JP | 2019-217570 A | 12/2019 |
| KR | 10-1976358 B1 | 8/2019 |

OTHER PUBLICATIONS

Chinese Office Action dated Aug. 18, 2023 in a counterpart Chinese patent application.

* cited by examiner

| Velocity | Time interval | Unit movement angle | Captured image number | Recognized object count |
|---|---|---|---|---|
| V | T (0.01sec) | $\mu \times 1$ | 1 | $Z_1$ |
| | | | i | $Z_i$ |
| | | | N/1=120 | $Z_{120}$ |

(B)

| Velocity | Time interval | Unit movement angle | Captured image number | Recognized object count |
|---|---|---|---|---|
| V | T×2 (0.02sec) | $\mu \times 2$ | 1 | $Z_1$ |
| | | | i | $Z_i$ |
| | | | N/2=60 | $Z_{60}$ |

(C)

| Velocity | Time interval | Unit movement angle | Captured image number | Recognized object count |
|---|---|---|---|---|
| V | T×4 (0.04sec) | $\mu \times 4$ | 1 | $Z_1$ |
| | | | i | $Z_i$ |
| | | | N/4=30 | $Z_{30}$ |

∗
∗
∗

(D)

| Velocity | Time interval | Unit movement angle | Captured image number | Recognized object count |
|---|---|---|---|---|
| V | T×j (0.01×j sec) | $\mu \times j$ | 1 | $Z_1$ |
| | | | I | $Z_i$ |
| | | | N/j | $Z_{N/j}$ |

| Velocity | Time interval | Unit movement angle | Captured image number | Recognized object count |
|---|---|---|---|---|
| V×2 | T (0.01sec) | μ×1×2 | 1 | $Z_1$ |
| | | | i | $Z_i$ |
| | | | N/1/2=60 | $Z_{60}$ |

(B)

| Velocity | Time interval | Unit movement angle | Captured image number | Recognized object count |
|---|---|---|---|---|
| V×2 | T×2 (0.02sec) | μ×2×2 | 1 | $Z_1$ |
| | | | ... | $Z_i$ |
| | | | N/2/2=30 | $Z_{30}$ |

(C)

| Velocity | Time interval | Unit movement angle | Captured image number | Recognized object count |
|---|---|---|---|---|
| V×2 | T×4 (0.04sec) | μ×4×2 | 1 | $Z_1$ |
| | | | ... | $Z_i$ |
| | | | N/4/2=15 | $Z_{15}$ |

⋮

(D)

| Velocity | Time interval | Unit movement angle | Captured image number | Recognized object count |
|---|---|---|---|---|
| V×2 | T×j/2 (0.01×j sec) | μ×j×2 | 1 | $Z_1$ |
| | | | ... | $Z_i$ |
| | | | N/j/2 | $Z_{N/j/2}$ |

| Velocity | Time interval | Unit movement angle | Captured image number | Recognized object count |
|---|---|---|---|---|
| $V \times 3$ | $T$ (0.01sec) | $\mu \times 1 \times 3$ | 1 | $Z_1$ |
| | | | i | $Z_i$ |
| | | | N/1/3=40 | $Z_{40}$ |

(B)

| Velocity | Time interval | Unit movement angle | Captured image number | Recognized object count |
|---|---|---|---|---|
| $V \times 3$ | $T \times 2$ (0.02sec) | $\mu \times 2 \times 3$ | 1 | $Z_1$ |
| | | | ... | $Z_i$ |
| | | | N/2/3=20 | $Z_{20}$ |

(C)

| Velocity | Time interval | Unit movement angle | Captured image number | Recognized object count |
|---|---|---|---|---|
| $V \times 3$ | $T \times 4$ (0.04sec) | $\mu \times 4 \times 3$ | 1 | $Z_1$ |
| | | | ... | $Z_i$ |
| | | | N/4/3=10 | $Z_{10}$ |

．
．
．

(D)

| Velocity | Time interval | Unit movement angle | Captured image number | Recognized object count |
|---|---|---|---|---|
| $V \times 3$ | $T \times j/3$ (最大) | $\mu \times j \times 3$ | 1 | $Z_1$ |
| | | | ... | $Z_i$ |
| | | | N/j/3 | $Z_{N/j/3}$ |

| Velocity | Time interval | Unit movement angle | Captured image number | Recognized object count |
|---|---|---|---|---|
| $V \times k$ | $T$ (0.01sec) | $\mu \times 1 \times k$ | 1 | $Z_1$ |
| | | | i | $Z_i$ |
| | | | N/1/k | $Z_{N/k}$ |

(B)

| Velocity | Time interval | Unit movement angle | Captured image number | Recognized object count |
|---|---|---|---|---|
| $V \times k$ | $T \times 2$ (0.02sec) | $\mu \times 2 \times k$ | 1 | $Z_1$ |
| | | | ... | $Z_i$ |
| | | | N/2/k | $Z_{N/k/2}$ |

(C)

| Velocity | Time interval | Unit movement angle | Captured image number | Recognized object count |
|---|---|---|---|---|
| $V \times k$ | $T \times 4$ (0.04sec) | $\mu \times 4 \times k$ | 1 | $Z_1$ |
| | | | ... | $Z_i$ |
| | | | N/4/k | $Z_{N/k/4}$ |

⋮

(D)

| Velocity | Time interval | Unit movement angle | Captured image number | Recognized object count |
|---|---|---|---|---|
| $V \times k$ | $T \times j/k$ (最大) | $\mu \times j \times k$ | 1 | $Z_1$ |
| | | | ... | $Z_i$ |
| | | | N/j/k | $Z_{N/j/k}$ |

FIG. 11

| Velocity V (%) | Time interval T (sec) | Unit movement angle μ(°) | Captured image number i | Required time (sec) | Recognized object count $Z_i$ |
|---|---|---|---|---|---|
| 70 | 0.060 | 6.63 | 4 | 0.24 | 19 |
| 80 | 0.050 | 6.31 | 5 | 0.25 | 19 |
| 70 | 0.050 | 5.52 | 5 | 0.25 | 19 |
| 60 | 0.050 | 4.73 | 5 | 0.25 | 19 |
| 80 | 0.040 | 5.05 | 7 | 0.28 | 19 |
| 70 | 0.060 | 6.63 | 5 | 0.30 | 19 |
| 60 | 0.060 | 5.68 | 5 | 0.30 | 19 |
| 80 | 0.050 | 6.31 | 6 | 0.30 | 19 |
| 70 | 0.050 | 5.52 | 6 | 0.30 | 19 |
| 80 | 0.050 | 6.31 | 7 | 0.35 | 19 |
| 60 | 0.070 | 6.63 | 5 | 0.35 | 19 |
| 70 | 0.060 | 6.63 | 6 | 0.36 | 19 |
| 90 | 0.030 | 4.26 | 5 | 0.15 | 18 |
| 90 | 0.030 | 4.26 | 6 | 0.18 | 18 |
| 90 | 0.040 | 5.68 | 5 | 0.20 | 18 |
| 80 | 0.040 | 5.05 | 5 | 0.20 | 18 |
| 70 | 0.040 | 4.42 | 5 | 0.20 | 18 |
| 70 | 0.050 | 5.52 | 4 | 0.20 | 18 |
| 60 | 0.050 | 4.73 | 4 | 0.20 | 18 |
| 90 | 0.030 | 4.26 | 7 | 0.21 | 18 |
| 80 | 0.030 | 3.79 | 7 | 0.21 | 18 |
| 90 | 0.040 | 5.68 | 6 | 0.24 | 18 |
| 80 | 0.040 | 5.05 | 6 | 0.24 | 18 |
| 70 | 0.040 | 4.42 | 6 | 0.24 | 18 |
| 60 | 0.060 | 5.68 | 4 | 0.24 | 18 |
| 90 | 0.040 | 5.68 | 7 | 0.28 | 18 |
| 60 | 0.070 | 6.63 | 4 | 0.28 | 18 |
| 50 | 0.070 | 5.52 | 4 | 0.28 | 18 |
| 50 | 0.080 | 6.31 | 4 | 0.32 | 18 |
| 50 | 0.070 | 5.52 | 5 | 0.35 | 18 |
| 50 | 0.080 | 6.31 | 5 | 0.40 | 18 |
| 90 | 0.020 | 2.84 | 7 | 0.14 | 17 |
| 70 | 0.040 | 4.42 | 4 | 0.16 | 17 |
| 80 | 0.030 | 3.79 | 6 | 0.18 | 17 |
| 60 | 0.060 | 5.68 | 3 | 0.18 | 17 |
| 60 | 0.070 | 6.63 | 3 | 0.21 | 17 |
| 50 | 0.070 | 5.52 | 3 | 0.21 | 17 |
| 50 | 0.060 | 4.73 | 4 | 0.24 | 17 |
| 50 | 0.080 | 6.31 | 3 | 0.24 | 17 |
| 50 | 0.060 | 4.73 | 5 | 0.30 | 17 |

| Velocity V (%) | Time interval T (sec) | Unit movement angle μ(°) | Captured image number i | Required time (sec) | Recognized object count Zi |
|---|---|---|---|---|---|
| 80 | 0.050 | 6.31 | 5 | 0.25 | 19 |
| 80 | 0.040 | 5.05 | 7 | 0.28 | 19 |
| 80 | 0.050 | 6.31 | 6 | 0.30 | 19 |
| 80 | 0.050 | 6.31 | 7 | 0.35 | 19 |
| 70 | 0.060 | 6.63 | 4 | 0.24 | 19 |
| 70 | 0.050 | 5.52 | 5 | 0.25 | 19 |
| 70 | 0.060 | 6.63 | 5 | 0.30 | 19 |
| 70 | 0.050 | 5.52 | 6 | 0.30 | 19 |
| 70 | 0.060 | 6.63 | 6 | 0.36 | 19 |
| 60 | 0.050 | 4.73 | 5 | 0.25 | 19 |
| 60 | 0.060 | 5.68 | 5 | 0.30 | 19 |
| 60 | 0.070 | 6.63 | 5 | 0.35 | 19 |
| 90 | 0.030 | 4.26 | 5 | 0.15 | 18 |
| 90 | 0.030 | 4.26 | 6 | 0.18 | 18 |
| 90 | 0.040 | 5.68 | 5 | 0.20 | 18 |
| 90 | 0.030 | 4.26 | 7 | 0.21 | 18 |
| 90 | 0.040 | 5.68 | 6 | 0.24 | 18 |
| 90 | 0.040 | 5.68 | 7 | 0.28 | 18 |
| 80 | 0.040 | 5.05 | 5 | 0.20 | 18 |
| 80 | 0.030 | 3.79 | 7 | 0.21 | 18 |
| 80 | 0.040 | 5.05 | 6 | 0.24 | 18 |
| 70 | 0.040 | 4.42 | 5 | 0.20 | 18 |
| 70 | 0.050 | 5.52 | 4 | 0.20 | 18 |
| 70 | 0.040 | 4.42 | 6 | 0.24 | 18 |
| 60 | 0.050 | 4.73 | 4 | 0.20 | 18 |
| 60 | 0.060 | 5.68 | 4 | 0.24 | 18 |
| 60 | 0.070 | 6.63 | 4 | 0.28 | 18 |
| 50 | 0.070 | 5.52 | 4 | 0.28 | 18 |
| 50 | 0.080 | 6.31 | 4 | 0.32 | 18 |
| 50 | 0.070 | 5.52 | 5 | 0.35 | 18 |
| 50 | 0.080 | 6.31 | 5 | 0.40 | 18 |
| 90 | 0.020 | 2.84 | 7 | 0.14 | 17 |
| 80 | 0.030 | 3.79 | 6 | 0.18 | 17 |
| 70 | 0.040 | 4.42 | 4 | 0.16 | 17 |
| 60 | 0.060 | 5.68 | 3 | 0.18 | 17 |
| 60 | 0.070 | 6.63 | 3 | 0.21 | 17 |
| 50 | 0.070 | 5.52 | 3 | 0.21 | 17 |
| 50 | 0.060 | 4.73 | 4 | 0.24 | 17 |
| 50 | 0.080 | 6.31 | 3 | 0.24 | 17 |
| 50 | 0.060 | 4.73 | 5 | 0.30 | 17 |

FIG. 14

| Velocity V (%) | Time interval T (sec) | Unit movement angle μ(°) | Captured image number i | Required time (sec) | Recognized object count Zi |
|---|---|---|---|---|---|
| 70 | 0.060 | 6.63 | 4 | 0.24 | 19 |
| 80 | 0.050 | 6.31 | 5 | 0.25 | 19 |
| 70 | 0.050 | 5.52 | 5 | 0.25 | 19 |
| 60 | 0.050 | 4.73 | 5 | 0.25 | 19 |
| 70 | 0.060 | 6.63 | 5 | 0.30 | 19 |
| 60 | 0.060 | 5.68 | 5 | 0.30 | 19 |
| 60 | 0.070 | 6.63 | 5 | 0.35 | 19 |
| 80 | 0.050 | 6.31 | 6 | 0.30 | 19 |
| 70 | 0.050 | 5.52 | 6 | 0.30 | 19 |
| 70 | 0.060 | 6.63 | 6 | 0.36 | 19 |
| 80 | 0.040 | 5.05 | 7 | 0.28 | 19 |
| 80 | 0.050 | 6.31 | 7 | 0.35 | 19 |
| 70 | 0.050 | 5.52 | 4 | 0.20 | 18 |
| 60 | 0.050 | 4.73 | 4 | 0.20 | 18 |
| 60 | 0.060 | 5.68 | 4 | 0.24 | 18 |
| 60 | 0.070 | 6.63 | 4 | 0.28 | 18 |
| 50 | 0.070 | 5.52 | 4 | 0.28 | 18 |
| 50 | 0.080 | 6.31 | 4 | 0.32 | 18 |
| 90 | 0.030 | 4.26 | 5 | 0.15 | 18 |
| 90 | 0.040 | 5.68 | 5 | 0.20 | 18 |
| 80 | 0.040 | 5.05 | 5 | 0.20 | 18 |
| 70 | 0.040 | 4.42 | 5 | 0.20 | 18 |
| 50 | 0.070 | 5.52 | 5 | 0.35 | 18 |
| 50 | 0.080 | 6.31 | 5 | 0.40 | 18 |
| 90 | 0.030 | 4.26 | 6 | 0.18 | 18 |
| 90 | 0.040 | 5.68 | 6 | 0.24 | 18 |
| 80 | 0.040 | 5.05 | 6 | 0.24 | 18 |
| 70 | 0.040 | 4.42 | 6 | 0.24 | 18 |
| 90 | 0.030 | 4.26 | 7 | 0.21 | 18 |
| 80 | 0.030 | 3.79 | 7 | 0.21 | 18 |
| 90 | 0.040 | 5.68 | 7 | 0.28 | 18 |
| 60 | 0.060 | 5.68 | 3 | 0.18 | 17 |
| 60 | 0.070 | 6.63 | 3 | 0.21 | 17 |
| 50 | 0.070 | 5.52 | 3 | 0.21 | 17 |
| 50 | 0.080 | 6.31 | 3 | 0.24 | 17 |
| 70 | 0.040 | 4.42 | 4 | 0.16 | 17 |
| 50 | 0.060 | 4.73 | 4 | 0.24 | 17 |
| 50 | 0.060 | 4.73 | 5 | 0.30 | 17 |
| 80 | 0.030 | 3.79 | 6 | 0.18 | 17 |
| 90 | 0.020 | 2.84 | 7 | 0.14 | 17 |

MEASUREMENT PARAMETER OPTIMIZATION METHOD AND DEVICE, AND COMPUTER CONTROL PROGRAM STORED ON COMPUTER-READABLE STORAGE MEDIUM

CROSS-REFERENCES TO RELATED APPLICATIONS

This application claims priority to Japanese Patent Application No. 2020-044682 filed Mar. 13, 2020, and No. 2020-097760 filed Jun. 4, 2020, the entire contents of which are incorporated herein by reference.

FIELD

The disclosure relates to an object measurement parameter optimization method and the like in a robot system for manipulating objects.

BACKGROUND

In inspection and production lines in factory automation (FA), there are known devices that measure the positions and orientations of objects such as piled workpieces (e.g., parts) and use a robot to transfer recognized objects to another location or container or process the objects. In such devices, parameters for optimally controlling the operation of the robot and the measuring device are set, and various tasks are performed by the robot and the measuring device based on the control parameters.

For example, JP 2017-56546A describes a method for successively determining a plurality of measurement positions and orientations as measurement parameters in a measuring device that includes a robot and a machine tool and measures a group of objects multiple times (multi-view measurement). In the method described in JP 2017-56546A, a plurality of movement end point positions of the robot are stored, and calibration is performed based on such positions in order to simultaneously determine error in the mechanical parameters of the robot and obtain the relative relationship between the coordinate system of the robot and the coordinate system of the machine tool.

JP 2017-56546A is an example of background art.

SUMMARY

In conventional measurement parameter setting in JP 2017-56546A and the like, when optimizing the measurement parameters, it is necessary to evaluate the suitability of combinations of parameters such as the object imaging speed, the captured image count, and the imaging time interval, and therefore the adjustment and optimization of measurement parameters has taken a lot of time and effort. Also, if the measuring device is mounted on a robot, the measurement parameters are dependent on the mechanical characteristics of the robot, and it is therefore necessary to adjust the measurement parameters for each robot. Further, if the evaluation target in object recognition is changed, even more effort and time are required, and the adjustment and optimization of measurement parameters thus become extremely difficult.

One or more embodiments may provide a method according to which measurement parameters for the measurement of objects by a measuring device mounted on a robot may be adjusted and optimized significantly more simply (with less effort, in a shorter time, and without robot dependency, for example) than in conventional technology.

(1) A measurement parameter optimization method according to one or more embodiments may be a method for optimizing a measurement parameter for use when one or more objects are measured by a measurement device (sensor) provided on a robot, the method including the first to fourth operations (1) to (4) described below. Note that there are no particular limitations on the configuration of the "robot", and examples may include a configuration having a robot arm and a hand that is provided at a leading end of the robot arm and is for manipulating objects. Also, there are no particular limitations on the "measurement device", and examples may include a device that is provided on the robot arm and may measure position information (e.g., 2D or 3D position information) regarding objects. More detailed examples of the "robot" and the "measurement device" are described later.

In one or more embodiments, a method or operations may be performed that include 1. acquiring N (N being greater than 1) captured images of the one or more objects while causing the measuring device to move with a velocity V, a time interval T, and a total movement angle θ as first measurement parameters; 2. based on acquiring N/j (j being an integer greater than or equal to 1) captured images of the one or more objects while causing the measuring device to move at the velocity V, a time interval Txj, and the total movement angle θ as second measurement parameters and performing image processing for recognizing positions and orientations of the one or more objects, estimating an evaluation value $Z_i$ indicating an accuracy of recognition of the one or more objects for each captured image number i (here, i=1, 2, ..., N/j−1, N/j) and storing the evaluation values $Z_i$ in association with the second measurement parameters as first data; based on acquiring N/j/k (k being an integer greater than or equal to 2) captured images of the one or more objects while causing the measuring device to move at a velocity Vxk, a time interval Txj/k, and the total movement angle θ as third measurement parameters and performing processing similar to the image processing in the second operation, estimating the evaluation value $Z_i$ indicating an accuracy of recognition of the one or more objects for each captured image number i (here, i=1, 2, ..., N/j/k−1, N/j/k) based on the first data, and storing the evaluation values $Z_i$ in association with the third measurement parameters as second data; and selecting a measurement parameter corresponding to data that satisfies a predetermined judgment criterion from among the second data, and determining the selected measurement parameter to be an optimized measurement parameter for use when the one or more objects are manipulated by the robot.

With the above described configuration, recognition results for one or more objects for the case of changing measurement parameters to different conditions (second measurement parameters or third measurement parameters) may be estimated based on first data, which is basic data acquired in advance before actual operation of the robot system, without performing actual measurement with the changed parameters. Accordingly, measurement parameters for the sensor 1 may be optimized without performing pre-measurement for all combinations of conditions that may be envisioned as measurement parameters, and it may be only necessary to perform detailed pre-measurement one time before actual operation for each type of workpieces 5 that is envisioned. Accordingly, measurement parameters for use when measuring objects with the measuring device provided on the robot may be adjusted and optimized significantly more simply (with less effort, in a shorter time, and without robot dependency, for example) than in conventional technology. Accordingly, robustness during object measurement, the work efficiency of object manipulation, and the overall throughput may be improved, and as a result, user convenience and versatility may be significantly improved.

(2) In the above configuration, more specifically, the predetermined judgment criterion may include a condition that the evaluation value Zi regarding the one or more objects is greater than or equal to an evaluation value that has been set in advance. With the above described configuration, setting the predetermined evaluation value higher in the judgment criterion may make it possible to further improve robustness, which is advantageous when prioritizing improvement of the measurement accuracy.

(3) Also, the predetermined judgment criterion may include a condition the evaluation value is greater than or equal to an evaluation value that has been set in advance, and furthermore that a required time for at least measurement is short. With the above described configuration, the time required for measurement may be minimized while satisfying a desired evaluation value, which is advantageous when giving priority to a reduction in measurement processing time.

(4) Also, the predetermined judgment criterion may include a condition the evaluation value is greater than or equal to an evaluation value that has been set in advance, and furthermore that the movement velocity V of the measuring device is fast. The above described configuration may be advantageous when giving priority to the velocity V of movement of the measuring device while also satisfying a desired evaluation value.

(5) Also, the predetermined judgment criterion may include a condition the evaluation value is greater than or equal to an evaluation value that has been set in advance, and furthermore that the captured image number i regarding the one or more objects is low. The above described configuration may be advantageous when giving priority to reducing the captured image number i while satisfying a desired evaluation value.

(6) Furthermore, in the above configurations, processing for capturing images of the one or more objects with the first measurement parameters may be performed at least one time, and it may be preferable that a plurality of times, and in the case of being performed a plurality of times, average values of the evaluation values Zi acquired each time may be stored as the first data. With the above described configuration, the accuracy and reliability of the first data obtained experimentally may be improved, and as a result, it is possible to further improve the robustness at the time of measuring the one or more objects, the work efficiency in manipulation of the one or more objects, and the overall throughput.

(7) Further, a configuration may be possible in which when the robot is changed as previously described, if data corresponding to measurement parameters corresponding to the velocity V and the time interval T according to a characteristic of a different robot that is different from the robot is included in any of the first data to third data, a measurement parameter in data that satisfies a predetermined judgment criterion is selected from among the first to third data and determined to be an optimized measurement parameter for use when the plurality of objects are to be manipulated by the different robot. With the above described configuration, as described above, it may be possible to provide a simple technique that can realize the optimization of measurement parameters without dependency on the robot.

(8) Alternatively, similarly, a configuration may be possible in which if data corresponding to measurement parameters corresponding to the velocity V and the time interval T according to a characteristic of a different robot that is different from the robot is included in the first data or the second data, data associated with a measurement parameter in the corresponding data is used as new first data, the second to fourth steps are performed to obtain new second data, and a measurement parameter in data that satisfies a predetermined judgment criterion is selected from among the new second data and determined to be an optimized measurement parameter for use when the plurality of objects are to be manipulated by the different robot. With the above described configuration as well, as described above, it may be possible to provide a simple technique that can realize the optimization of measurement parameters without dependency on the robot.

(9) Also, one example of a measurement parameter optimization device according to one or more embodiments may be a device for optimizing a measurement parameter for use when a plurality of objects are measured by a measuring device provided on a robot, the device including at least one processor, and the at least one processor executing the steps of the measurement parameter optimization method according to one or more embodiments.

(10) Also, one example of a computer control program according to one or more embodiments may be a program stored on a computer-readable storage medium that, in order to perform measurement parameter optimization for when a plurality of objects are measured by a measuring device provided on a robot, causes a computer including at least one processor to execute the steps of the measurement parameter optimization method according to the present disclosure, that is to say, is a program for causing a computer to effectively function as the measurement parameter optimization device according to the present disclosure.

(11) Also, one example of a robot system according to one or more embodiments may include a robot, a measuring device provided on the robot, and a control device that is connected to the robot and the measuring device, the control device including at least one processor, and the at least one processor executing the steps of the measurement parameter optimization method according to the present disclosure. In other words, in the robot system, the measurement parameter optimization device according to one or more embodiments may function as the control device.

Note that in one or more embodiments, "unit" and "device" may not simply mean a physical means, and also may include a configuration in which the functions of the "unit" or "device" are realized by software. Also, the functions of one "unit" or "device" may be realized by two or more physical means or devices, and the functions of two or more "units" or "devices" may be realized by one physical means or device. Further, "unit" and "device" are concepts that can be restated as, for example, "means" and "system".

According to one or more embodiments, measurement parameters for the measurement of objects by a measuring device mounted on a robot may be adjusted and optimized significantly more simply (with less effort, in a shorter time, and without robot dependency, for example) than in conventional technology. Accordingly, robustness during object measurement, the work efficiency of object manipulation, and the overall throughput may be improved, and as a result, user convenience and versatility are significantly improved.

BRIEF DESCRIPTION OF THE DRAWINGS

FIG. 7 is a diagram illustrating an example of first data in step S502 and first data in step S503 of an operation example in a table format.

FIG. 8 is a diagram illustrating an example of second data in step S504 of an operation example in a table format.

FIG. 9 is a diagram illustrating an example of second data in step S504 of an operation example in a table format.

FIG. 10 is a diagram illustrating an example of second data in step S504 of an operation example in a table format.

FIG. 11 is a diagram illustrating a specific example of second data obtained by experimentally executing steps S501 to S504 using a sensor 1 for a plurality of workpieces 5 (hexagon head bolts) in a table format.

FIG. 13 is a diagram in which second data illustrated, such as in FIG. 11 is sorted in descending order of recognized object count Zi, and data having a same recognized object count Zi is sorted in descending order of velocity V.

FIG. 14 is a diagram in which second data illustrated, such as in FIG. 11 is sorted in descending order of recognized object count Zi, and data having a same recognized object count Zi is sorted in ascending order of captured image number i.

DETAILED DESCRIPTION

Figure 1A:
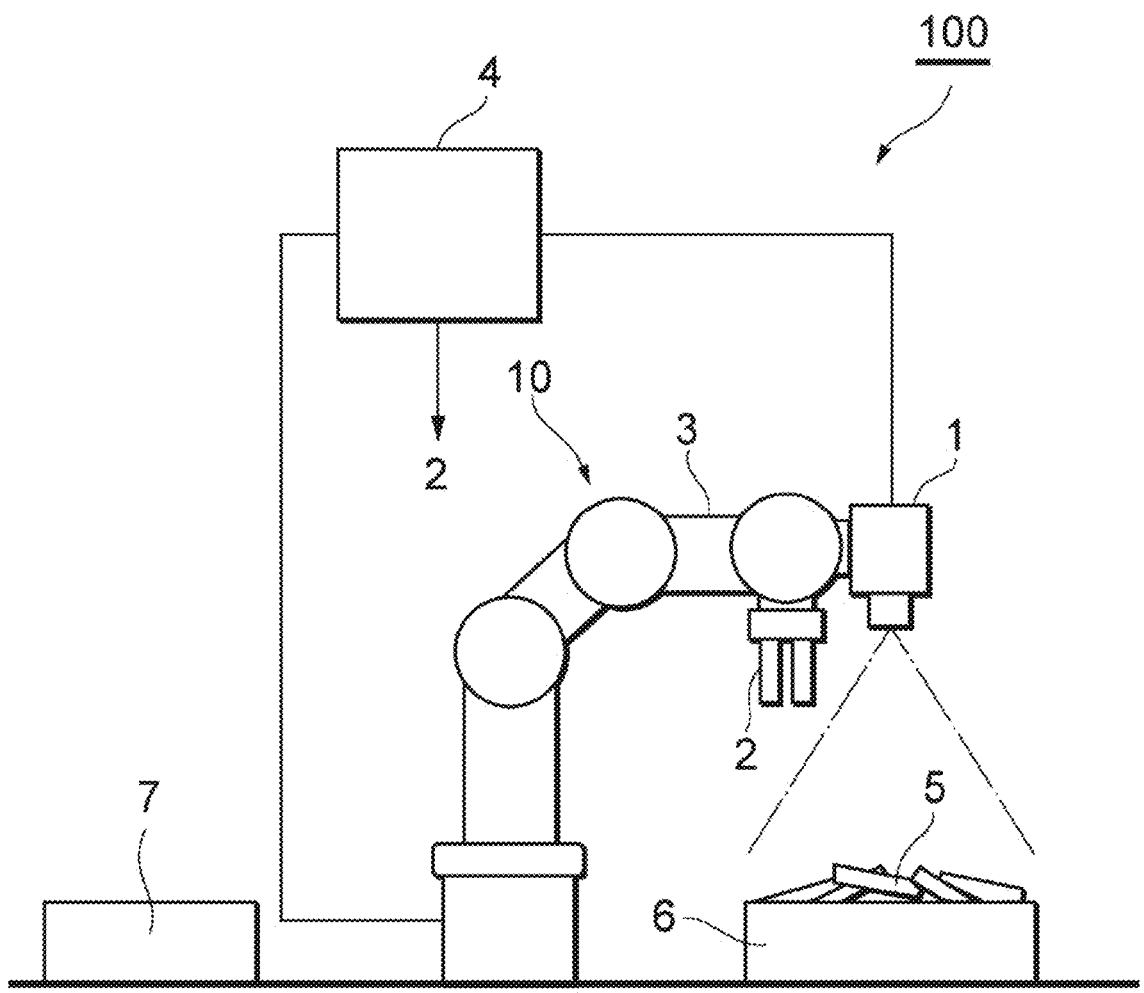
FIGS. 1A and 1B are schematic diagrams each illustrating a plan view of an example of an application scene for a robot system that includes a control device according to one or more embodiments.

Hereinafter, one or more embodiments are described with reference to the drawings. Note that one or more embodiments described below are merely examples, and are not intended to exclude the application of various modifications and techniques not specified below. In other words, the examples of the present disclosure can be implemented with various modifications without departing from the spirit of the present disclosure. Further, in the description of the following drawings, the same or similar portions are designated by the same or similar reference numerals, and the drawings are schematic and do not necessarily match the actual dimensions and ratios. Further, the drawings may include parts having different dimensional relationships and ratios from each other.

1. APPLICATION EXAMPLE

First, an example of a scene to which an example of one or more embodiments are applied will be described with reference to FIGS. 1 and 2. FIGS. 1 and 2 are schematic diagrams illustrating an example of an application scene for a robot system that includes a control device according to the present embodiment. In a robot system 100 according to the present embodiment, it is possible to perform an operation in which a plurality of workpieces 5 piled in a storage container 6 such as a bin are taken out from the storage container 6 by a robot 10 and transferred to another storage container 7 or the like and arranged (movement path P1 in FIG. 2), and/or an operation in which, after transferring workpieces 5, the robot 10 is returned toward the storage container 6 in order to take out the next workpiece 5 (movement route P2 in FIG. 2). Note that the workpieces 5 may be stacked flat on a table, a platform, or the like instead of being piled in the storage container 6. Also, there are no particular limitations on the type of workpieces 5, and examples thereof include mechanical parts of an automobile power train system (e.g., an engine or a transmission), electronic parts of an electrical system, and the like. Also, in addition to the robot 10, the robot system 100 includes a sensor 1 that is provided on the robot 10 (an example of the "measuring device" in the present disclosure), and a control device 4 that is connected to the sensor 1 and the robot 10 (an example of the "measurement parameter optimization device" in the present disclosure).

Figure 1B:
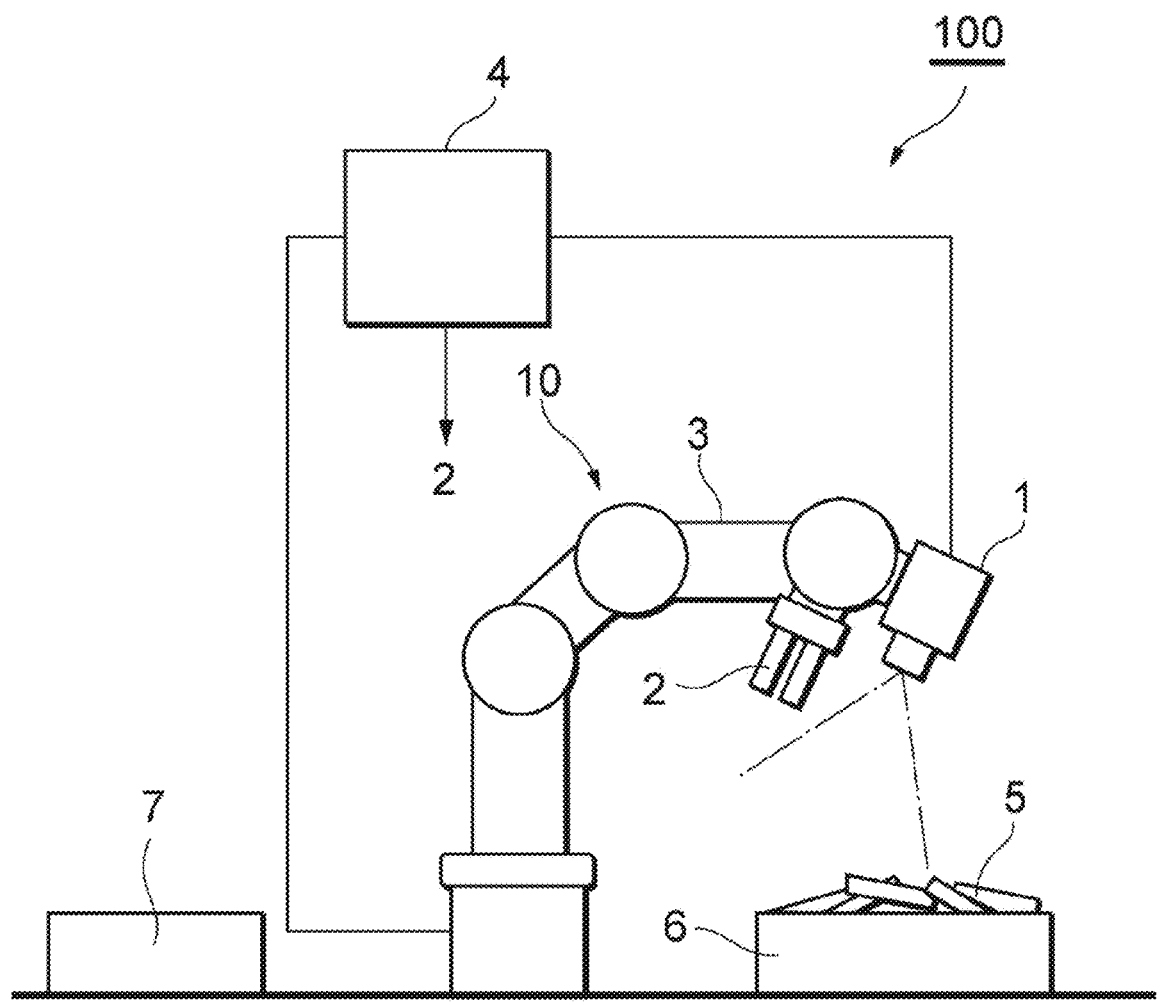
Figure 2:
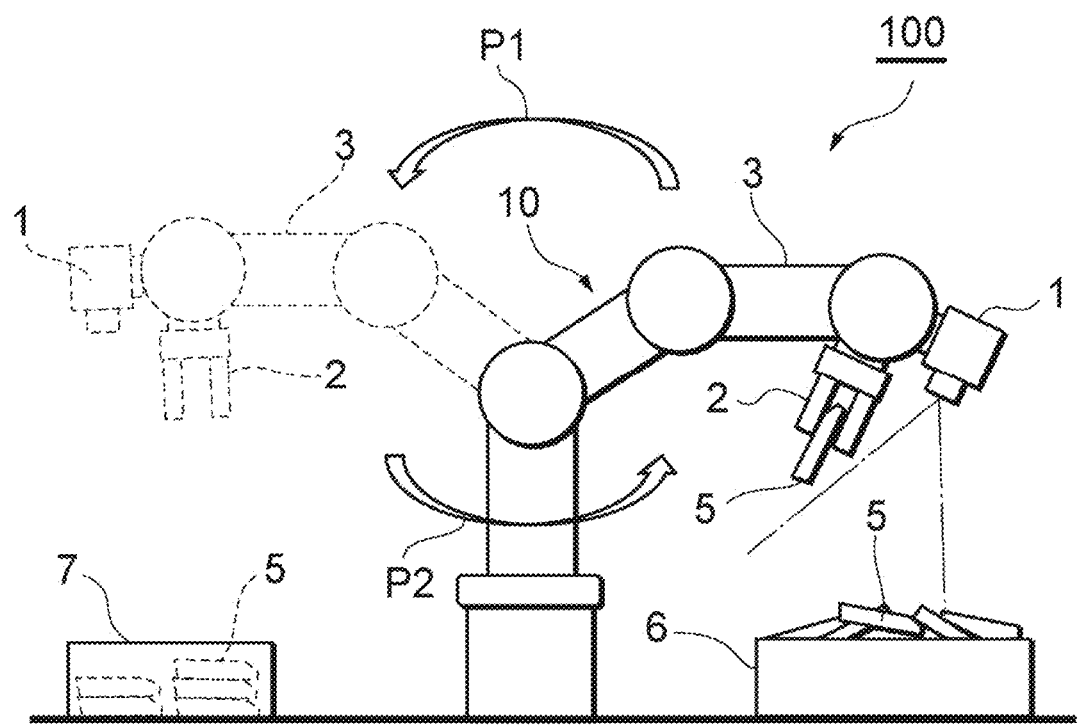
FIG. 2 is a schematic diagram illustrating a plan view of an example of an application scene for the robot system that includes a control device according to one or more embodiments.

The sensor 1 is a 3D sensor that acquires measurement data including position information (for example, three-dimensional position information) of the workpieces 5, and is disposed at the leading end of a robot arm 3 of the robot 10, and as shown in FIGS. 1(A) and 1(B), the workpieces 5 are imaged in a predetermined visual field (angle) and with predetermined measurement parameters. The sensor 1 may be, for example, a distance sensor that measures a group of points, or a distance image sensor that combines a distance sensor and a two-dimensional sensor and acquires a distance image. The distance sensor is a sensor that measures a distance d as depth information. The two-dimensional sensor is an image sensor that captures a two-dimensional image, and the two-dimensional image is different from a distance image in that distances d are not included as pixel values. The distance image sensor may be, for example, a camera that acquires a distance image having distances d as pixel values by capturing a plurality of two-dimensional images of the workpieces 5 while changing the imaging position of the two-dimensional sensor, and performing stereoscopic view image processing. Alternatively, the distance image sensor may be a stereo camera that acquires a distance image that has distances d as pixel values by simultaneously capturing images of the workpieces 5 from different directions.

Further, although not essential, the sensor 1 may have a projector (not shown) that irradiates the workpieces 5 with so-called 3D lighting that includes appropriate measurement light (e.g., pattern light or scan light used in active measurement) or so-called 2D lighting which is normal lighting. There are no particular limitations on the configuration of such a projector, and for example, in the case of projecting pattern light, it may have a configuration including a laser light source, a pattern mask, and a lens. Light emitted from the laser light source is converted into measurement light (pattern light) having a predetermined pattern by using a pattern mask in which a predetermined pattern is formed, and is projected onto the workpieces 5 through a lens.

There are no particular limitations on the "predetermined pattern," and for example, various patterns used in active one-shot measurement can be used. Specific examples include: a so-called line-based pattern in which a plurality of lines are arranged in two dimensions at predetermined intervals; a so-called area-based pattern in which various types of unit images, unit figures, geometric shapes, or the like that can be distinguished from each other are arranged in two dimensions (may be regular or random, and regular parts and random parts may be mixed or superimposed); and a so-called grid graph-based pattern in which graph symbols or the like are arranged in a grid of vertical and horizontal lines. Note that the predetermined patterns may each include ID information for distinguishing between lines or unit figures for encoding, for example.

Also, there are no particular limitations on the method for measuring the workpieces 5, and it is possible to appropriately select and use, for example, various active measurement methods that use the straightness of light (e.g., a space coding pattern projection method based on triangular ranging, a time coding pattern projection method, or a moiretopography method), various passive measurement methods that use the straightness of light (e.g., a stereo camera method based on triangular distance measurement, a visual volume crossing method, a factor decomposition method, or a depth from focusing method based on coaxial distance measurement), or various active measurement methods that use the speed of light (e.g., a time of flight method based on simultaneous distance measurement (Time of Flight), or a laser scan method).

Examples of measurement data for the workpieces 5 include image data (e.g., 3D point cloud data or distance image) acquired by the aforementioned measurement methods, and appropriate data that can be matched with 3D model data of the workpieces 5. Here, examples of three-dimensional model data of the workpieces 5 include three-dimensional coordinate data, two-dimensional coordinate data obtained by projecting three-dimensional coordinate data in two dimensions in accordance with various positions and orientations of the workpieces 5, and other data corresponding to an appropriate template or pattern. Note that matching with three-dimensional model data is not essential in workpiece 5 recognition, and it is possible to employ recognition that does not use model data (so-called modeless recognition).

The robot 10 is, for example, an articulated robot (e.g., a vertical articulated robot or a horizontal articulated robot) that includes a hand 2 for manipulating (e.g., grasping, suctioning, moving, assembling, or inserting) the workpieces 5, and a robot arm 3 that has the hand 2 provided at the leading end. Various joints of the robot 10 are provided with a driving device such as a servomotor for driving the joint, and a displacement detecting device such as an encoder for detecting the displacement (angle displacement) of the joint. Further, the robot 10 operates as a manipulator that operates autonomously, and can be used for various purposes such as picking, assembling, transporting, painting, inspecting, polishing, and cleaning the workpieces 5.

The hand 2 is an example of an end effector, and has a gripping mechanism capable of gripping and releasing (grasping and releasing) individual workpieces 5. The robot arm 3 has a drive mechanism for moving the hand 2 to a gripping position (pickup position) for gripping a workpiece 5 in the storage container 6, and moving the hand 2 that is gripping the workpiece 5 from the gripping position to a release position (dropping position) in another storage container 7.

The control device 4 is connected to both the sensor 1 and the robot 10, and controls processing workpiece 5 measurement processing performed by the sensor 1, workpiece 5 manipulation processing performed by the hand 2, driving processing of the robot 10 (the hand 2, the robot arm 3, and the like), and also processing related to various operations and calculation required in the robot system 100. Also, the control device 4 executes measurement parameter optimization when the sensor 1 measures a plurality of workpieces 5 prior to the actual operation of the robot system 100.

In optimization processing, (1) first measurement parameters that enable measuring and evaluating the positions and orientations of a plurality of workpieces 5 in more detail are set, and envisioned workpieces 5 (e.g., workpieces 5 piled in the storage container 6) are imaged a plurality of times while moving the sensor 1 under the set conditions. (2) Image processing is performed using captured images corresponding to captured image numbers i selected from among the N captured images, evaluation values $Z_i$ indicating the accuracy of workpiece 5 recognition (e.g., the number of recognized workpieces 5) are acquired, and the evaluation values $Z_i$ are stored as first data together with the first measurement parameters. (3) Evaluation values $Z_i$ indicating the accuracy of workpiece 5 recognition (e.g., the number of recognized workpieces 5) are estimated based on acquiring captured images of the workpieces 5 using second measurement parameters that are different from the first measurement parameters with the exception of the movement velocity of the sensor 1 and performing the same processing as the aforementioned image processing, and the estimated evaluation values $Z_i$ are stored as first data together with the second measurement parameters.

(4) Evaluation values $Z_i$ indicating the accuracy of workpiece 5 recognition (e.g., the number of recognized workpieces 5) are estimated based on, using the first data obtained in either or both of the above operations (2) and (3), acquiring captured images of the workpieces 5 with third measurement parameters that are different from the first measurement parameters and the second measurement parameters and performing the same processing as the aforementioned image processing, and the acquired evaluation values $Z_i$ are stored as second data together with the third measurement parameters. (5) At least one measurement parameter corresponding to data that satisfies a predetermined judgment criterion (e.g., the evaluation value is a predetermined value or higher, and furthermore a criterion regarding at least any one of the measurement time, the movement velocity, and the captured image count) is selected from among the obtained second data, and, for example, the user determines a desired measurement parameter from among the selected measurement parameters as an optimized measurement parameter for use in the actual operation of the robot system 100.

According to the control device 4, the robot system 100 including the control device 4, and the measurement parameter optimization method implemented in the robot system 100 in the present application example, recognition results regarding workpieces 5 in cases of changing the measurement parameters to different conditions can be estimated based on the results of image capturing and image processing performed for the workpieces 5 using basic first measurement parameters before the actual operation of the robot system 100. Accordingly, measurement parameters for the sensor 1 can be optimized without performing pre-measurement for all combinations of conditions that can be envisioned as measurement parameters, and it is only necessary to perform detailed pre-measurement one time before actual operation for each type of workpieces 5 that is envisioned. Also, even if the robot 10 is changed, by utilizing the parameter set corresponding to the first data and the second data acquired in advance for a certain robot 10 equipped with the sensor 1, measurement parameters for the manipulation of workpieces 5 by different robots can be optimized without performing new pre-measurement.

Therefore, according to the present disclosure, measurement parameters for the sensor 1 in a task in which various types of workpieces 5 are manipulated by robot systems 100 that include various robots 10 can be optimized significantly more simply (with less effort, in a shorter time, and without robot dependency, for example) than in conventional technology. Accordingly, robustness during workpiece 5 measurement, the work efficiency of workpiece 5 manipulation, and the overall throughput can be improved, and as a result, user convenience and versatility are significantly improved.

2. CONFIGURATION EXAMPLE

Hardware Configuration

Figure 3:
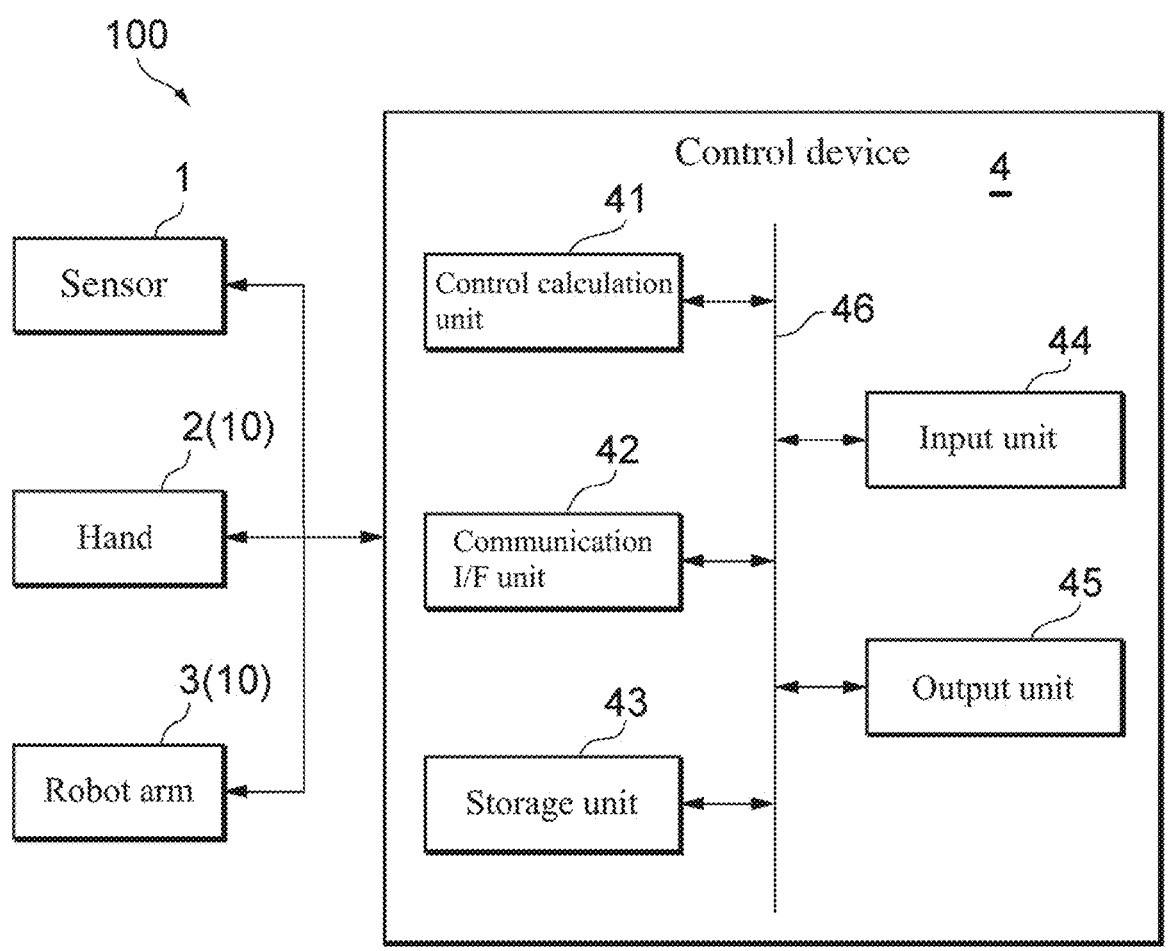
FIG. 3 is a diagram illustrating a plan view of an example of a hardware configuration of a robot system that includes a control device according to one or more embodiments.

Next, an example of the hardware configuration of the robot system 100 according to the present embodiment will be described with reference to FIG. 3. FIG. 3 is a schematic diagram illustrating an example of the hardware configuration of the robot system 100 that includes the control device 4 according to the present embodiment. In the example in FIG. 3 as well, the robot system 100 includes the sensor 1, the robot 10 that has the hand 2 and the robot arm 3, and the control device 4, which are shown in FIGS. 1 and 2. Here, the control device 4 includes a control calculation unit 41, a communication interface (I/F) unit 42, a storage unit 43, an input unit 44, and an output unit 45, and these units may be communicably connected to each other via a bus line 46.

The control calculation unit 41 includes a CPU (Central Processing Unit), a RAM (Random Access Memory), a ROM (Read Only Memory), and the like, and controls various constituent components and performs various type of calculation in accordance with information processing.

The communication I/F unit 42 is a communication module for performing wired or wireless communication with "units" and "devices" that are other constituent components, for example. Any communication method can be used by the communication I/F unit 42 for communication, and examples thereof include LAN (Local Area Network) and USB (Universal Serial Bus) technology, and an appropriate communication line equivalent to the bus line 46 can also be applied. The sensor 1, the hand 2, and the robot arm 3 can all be provided so as to be able to communicate with the control calculation unit 41 and the like via the communication I/F unit 42.

The storage unit 43 is an auxiliary storage device such as a hard disk drive (HDD) or a solid state drive (SSD), and stores: various types of programs executed by the control calculation unit 41 (arithmetic computation programs for executing various types of processing including the processing shown in (1) to (7) above, and a control program for performing processing for controlling the operation of the sensor 1, the hand 2, and the robot arm 3), a database including measurement data output from the sensor 1, measurement parameters, recognition parameters, and various types of calculation parameters, various types of calculation results and calculation result data, data regarding position/orientation recognition results for workpieces 5, data regarding picking statuses and picking records for workpieces 5, three-dimensional model data for workpieces 5, data regarding a measurement area that can include workpieces 5, setting data regarding the position and orientation of the sensor 1 that performs measurement in the measurement area, and the like. Accordingly, various processing functions in the functional configuration example described later are realized by the control calculation unit 41 executing the arithmetic calculation programs and the control program stored in the storage unit 43.

The input unit 44 is an interface device for receiving various types of input operations from a user who uses the robot system 100, and can be realized by, for example, a mouse, a keyboard, a touch panel, or a voice microphone. The output unit 45 is an interface device for notifying a user or the like who uses the robot system 100 of various types of information by display, audio output, print output, or the like, and can be realized by a display, a speaker, or a printer, for example.

Functional Configuration

Figure 4:
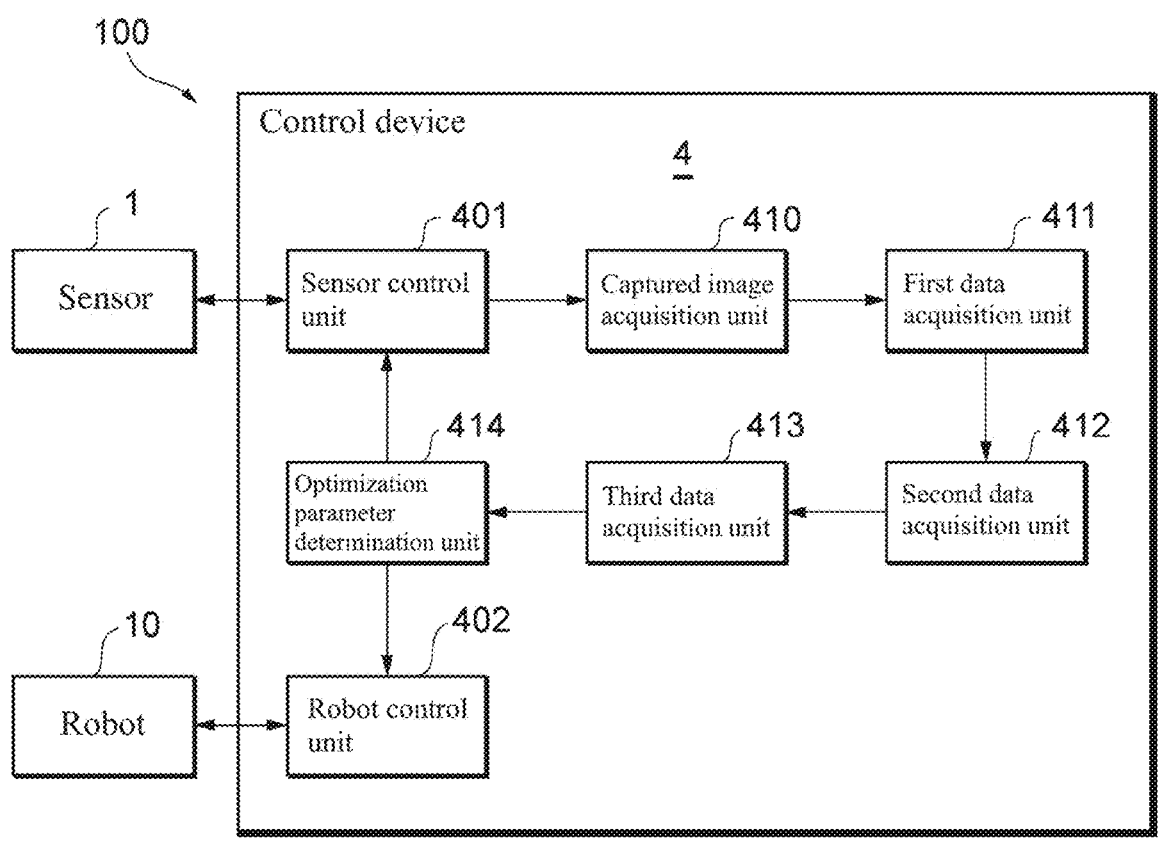
FIG. 4 is a diagram illustrating a plan view of an example of a functional configuration of a robot system that includes a control device according to one or more embodiments.

Next, an example of the functional configuration of the robot system 100 including an object recognition processing device according to the present embodiment will be described with reference to FIG. 4. FIG. 4 is a schematic diagram illustrating an example of the functional configuration of the robot system 100 including the control device 4 according to one or more embodiments.

The control calculation unit 41 of the robot system 100 shown in FIG. 4 deploys various types of programs (control programs, calculation programs, and the like) stored in the storage unit 43 to the RAM. The control calculation unit 41 interprets and executes the programs that were deployed to the RAM by the CPU, and controls various constituent components. In some embodiments, a non-transitory computer-readable storage medium may store a program or programs for performing operations disclosed herein. Accordingly, as described above, the robot system 100 according to one or more embodiments may perform an operation in which workpieces 5 piled in the storage container 6 are taken out and transferred to another storage container 7 or the like and arranged (movement path P1 in FIG. 2), and/or an operation in which, after transferring workpieces 5, the robot 10 is returned toward the storage container 6 in order to take out the next workpiece 5 (movement path P2 in FIG. 2). Also, in order to optimize the measurement parameters when measuring workpieces 5 with the sensor 1 prior to the actual operation of the robot system 100, the control calculation unit 41 can realize a configuration that includes, as function units capable of executing the processing of the steps shown below, a sensor control unit 401, a robot control unit 402, a captured image acquisition unit 410, a first data acquisition unit 411, a second data acquisition unit 412, a third data acquisition unit 413, and an optimization parameter determination unit 414.

Note that although an example in which the functions realized by the control device 4 provided in the robot system 100 are realized by a general-purpose CPU is described in one or more embodiments, some or all of the above-described functions may be realized by one or more dedicated processors. Further, functional configurations of the control device 4 provided in the robot system 100 may of course be omitted, replaced, or added as appropriate according to one or more embodiments or the configuration example. Also, the "control device" can be understood as a general information processing device (e.g., a computer or a workstation).

3. OPERATION EXAMPLE

Figure 5:
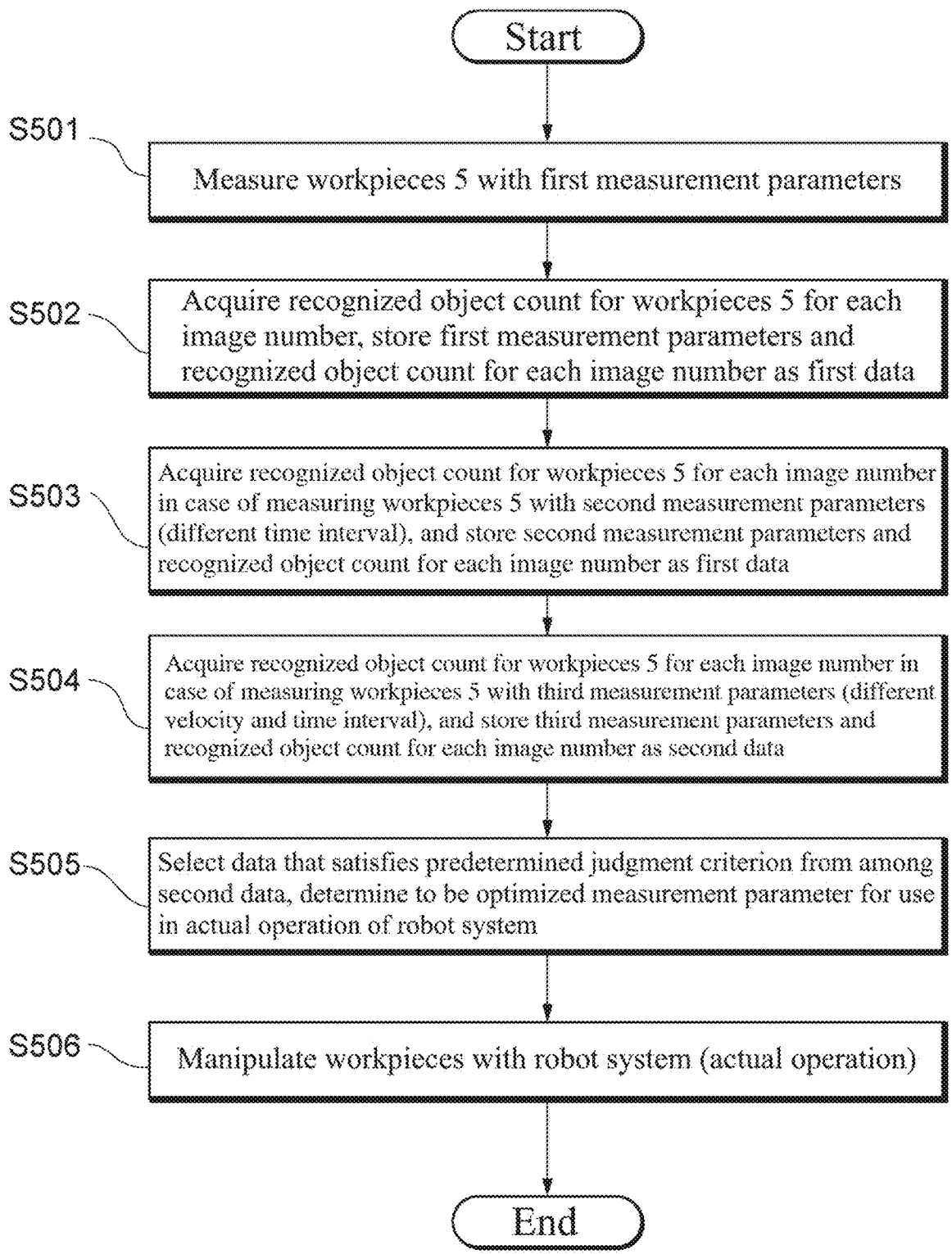
FIG. 5 is a diagram illustrating a flowchart of an example of a processing procedure in a robot system that includes a control device according to an operation example.

Next, using FIG. 5, operation of the robot system 100 will be described by way of example of a procedure for optimizing a measurement parameter when measuring workpieces 5 with the sensor 1 prior to the actual operation of the robot system 100. FIG. 5 is a flowchart showing an example of a processing procedure in the robot system 100 including the control device 4 according to the above described operation example, and shows an example of a processing procedure in a method for optimizing a measurement parameter of the robot system 100. Note that the processing procedure described below is merely an example, and the processing steps may be changed as desired within the scope of the technical idea of the present disclosure. Further, in the processing procedure described below, steps can be omitted, replaced, and added as appropriate according to one or more embodiments and configuration example.

First, the user of the robot system 100 starts up the robot system 100 so that various types of programs (calculation programs, control programs, measurement parameter optimization, and the like) can be executed. The control calculation unit 41 (at least one processor) in the control device 4 controls the operation of the sensor 1 and the robot 10 according to the following processing procedure, and performs calculation processing using functional units in the control device 4.

Step S501: First Step

Figure 6:
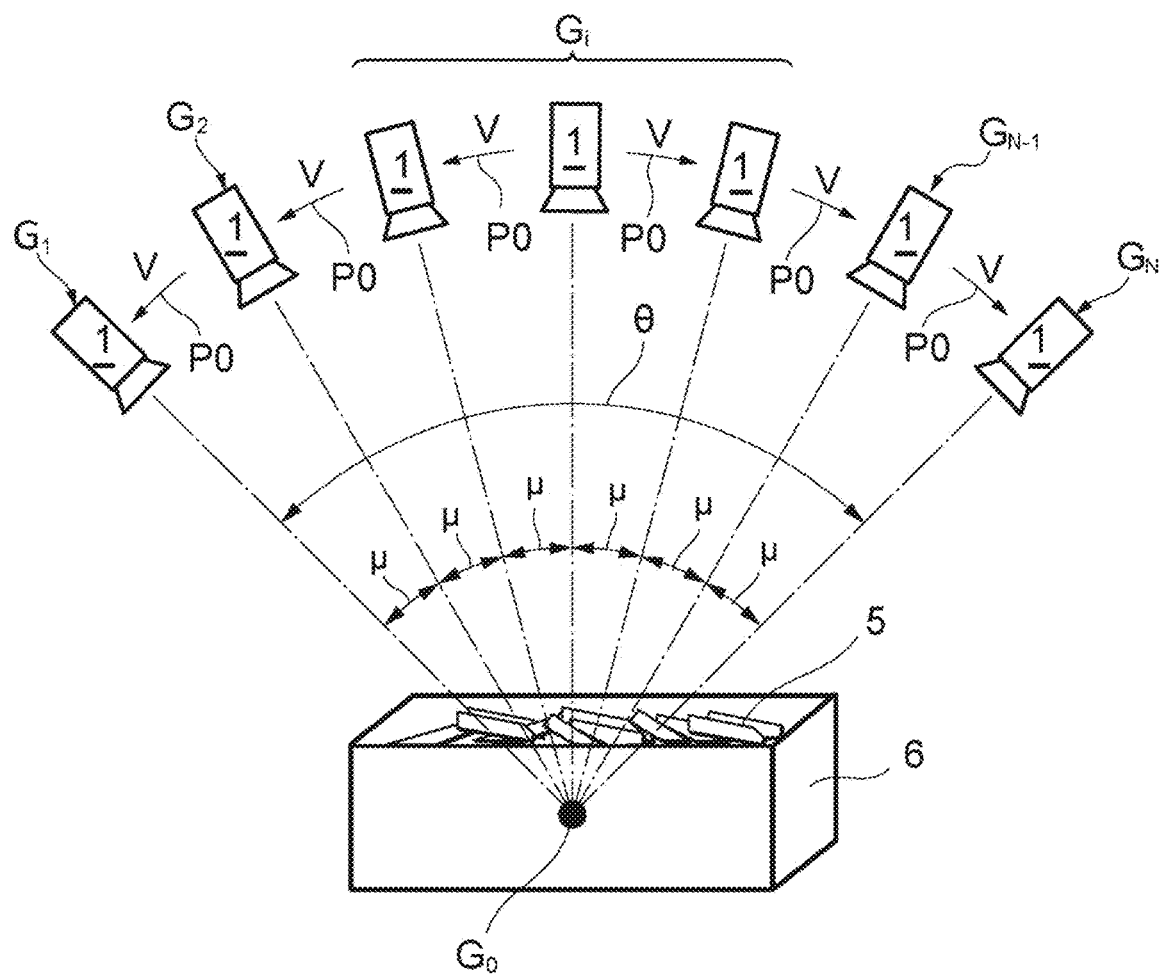
FIG. 6 is a schematic diagram illustrating a plan view of a concept of movement of a sensor 1 in step S501 of an operation example.
Figure 12A:
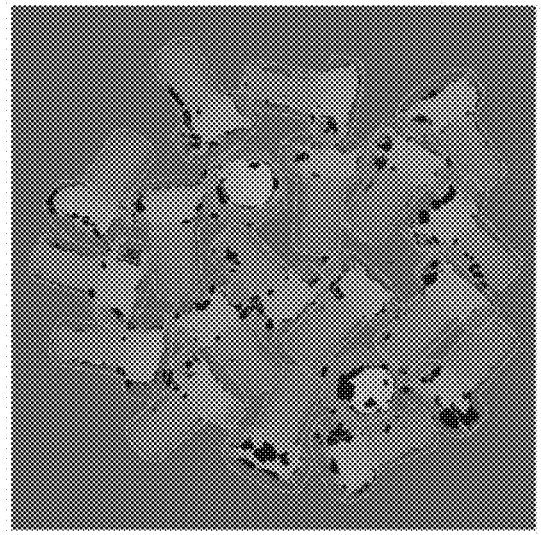
FIGS. 12A, 12B, 12C, and 12D are diagrams each illustrating a plan view of an example in which, for a data set, such as shown in FIG. 11, recognition results (contour lines) are superimposed on an image of workpieces 5 captured by a sensor 1.
Figure 12B:
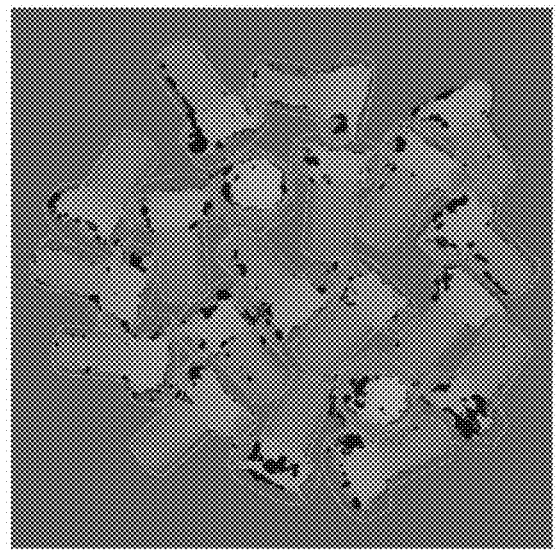
Figure 12C:
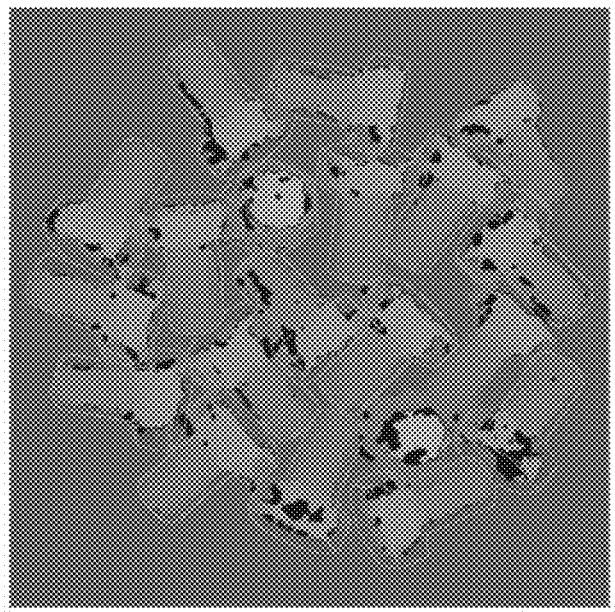
Figure 12D:
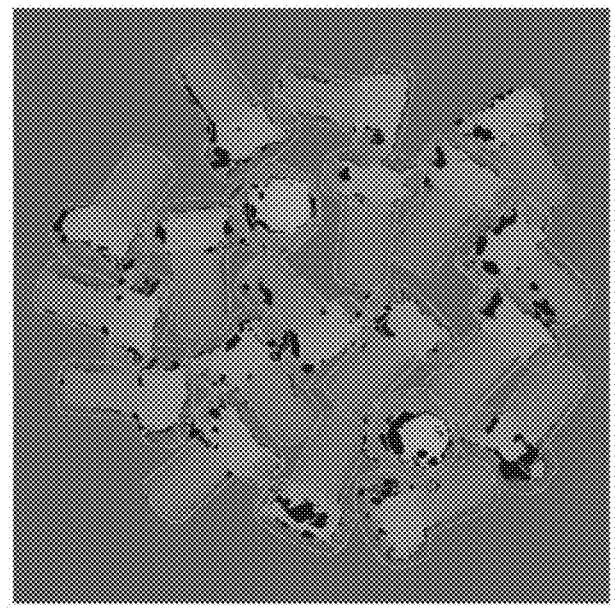

In step S501, first, a movement path P0 for movement of the sensor 1 by the robot 10 (the robot arm 3 thereof), as well as a movement velocity V, a time interval T, and a total movement angle θ are set as first measurement parameters. Here, FIG. 6 is a plan view schematically showing a concept of movement of the sensor 1 in step S501. As shown in the figure, the movement path P0 can be set to form an arc that is centered on coordinates G0, which are approximately the volume center of a plurality of workpieces 5 piled in the container 6, for example. Note that the locus of movement of the sensor 1 is not limited to forming an arc shape (a shape having a constant curvature), and may form a straight line shape, a non-straight line shape, or a shape whose curvature changes, for example, and the coordinates G0 may be changed. Further, the same type of workpieces that are the operation target in actual operation of the robot system 100 are selected as the workpieces 5 that are used experimentally here.

There are no particular limitations on the velocity V, and it is possible to set any value in a velocity range that can be realized as the movement velocity of the sensor 1, but setting a slower velocity is favorable in view of making it possible to acquire a larger number of detailed images. Further, there are no particular limitations on the time interval T, and for example, it is possible to set any value in an interval range that can be realized as the imaging interval of the sensor 1, but setting the minimum time interval in particular is favorable in view of making it possible to acquire a larger number of detailed images. Also, there are no particular limitations on the total movement angle θ, and for example, it is possible to set an angle that corresponds to the maximum distance of the movable range of the sensor 1.

The velocity V, the time interval T, and the total movement angle θ are used to obtain a captured image count $N=\theta/V/T$ in the imaging of workpieces 5 using the first measurement parameters, as well as a unit movement angle (movement angle for each time interval T) $\mu=V\times T$, and a plurality of images of the workpieces 5 in the container 6 are captured in accordance with a command from the sensor control unit 401 while the sensor 1 is moved in an arc along the movement path P0 under such conditions in accordance with a command from the robot control unit 402, thus capturing the N captured images. In other words, in the above described step, as shown in FIG. 6, the N captured images are acquired by image capturing being performed N times by the sensor 1 while facing the piled workpieces 5 at various elevation angles (at sensor 1 positions P1, P2, ..., PN−1, PN; each pair of adjacent sensor positions forming the unit movement angle μ).

Step S502: Second Step (1)

In step S502, the first data acquisition unit 411 sequentially extracts captured images corresponding to the captured image number i from among the N captured images that were obtained and performs image processing thereon, and sequentially acquires evaluation values Zi that indicate the accuracy of workpiece 5 recognition (e.g., the number of recognized workpieces 5). Here, i=1, 2, ..., N−1, N (i.e., i is an integer of 1 to N), and in one specific example, image processing (i=1) is performed on the first captured image (at an initial position G1 of the sensor 1), and image processing (i=2) is performed using the first and second captured images captured at adjacent sensor positions (the initial position G1 and the next position G2 of the sensor 1). Such processing is sequentially repeated until i=N (the positions Gi to GN of the sensor 1), and the evaluation value Zi obtained for each captured image number i is associated with the first measurement parameters and stored in the storage unit 43 as the first data.

Step S503: Second Step (2)

In step S503, the first data acquisition unit 411 first sets the movement path P0 for movement of the sensor 1 by the robot 10 (the robot arm 3 thereof), as well as the movement velocity V, the time interval T×j (j being an integer of 2 or more), and the total movement angle θ as second measurement parameters. In other words, in the case of the second measurement parameters, the time interval of measurement by the sensor 1 is changed so as to be an integral multiple of the time interval among the first measurement parameters. Note that in step S503, instead of actually performing measurement with the second measurement parameters, the N captured images that were obtained in step S501 are used in order to estimate an evaluation value Zi indicating the accuracy of workpiece 5 recognition (e.g., the number of recognized workpieces 5) for each captured image number i based on acquiring captured images of the workpieces 5 using the second measurement parameters and performing the same processing as the image processing in step S502. The evaluation value Zi obtained for each captured image number i for each value of j is associated with the second measurement parameters and stored in the storage unit 43 as the first data.

Note that the processing in step S502 is the same as the processing when j=1 in step S503, the data obtained in steps S502 and S503 will be referred to as "first data" for convenience in the description. It should also be noted that when acquiring the first data, both steps S502 and S503 do not necessarily need to be executed, and either step may be executed. Also, if both steps S502 and S503 are executed, either one of the steps may be executed first and the other step may be executed later, and there are no particular limitations on the order of execution.

Also, in the above description, it is described that in step S503, the velocity V is fixed to a constant value and the time interval T is changed to generate various variations of image sets in which the captured images are evenly thinned out, but by fixing the time interval T to a constant value and changing the velocity V, it is possible to generate various variations of image sets in which the captured images are evenly thinned out.

Here, FIG. 7 is a diagram showing an example of the first data in step S502 (the first data in the second step (1) and the first data in step S503 (second step (2)) in a table format. The data set shown in FIG. 7(A) corresponds to the first data acquired in step S502, and the first data is an example where the time interval T is 0.01 (sec), the captured image count N is 120, and the unit movement angle μ is θ/(120−1) at the time of measurement, and the evaluation values Zi (i=1 to 121) are acquired. In other words, here, the total movement angle θ is divided into 119 sections, and image capturing is performed 120 times.

Also, the data sets shown in FIGS. 7(B) to 7(D) correspond to the first data acquired in step S503. The data set shown in FIG. 7(B is an example where j is 2, and the time interval T is T×2=0.02 (sec), the captured image count N is 60, and the unit movement angle μ is μ×2 at the time of measurement. Accordingly, the data pieces for the evaluation values Zi for the captured image counts i=1, 3, 5, . . . , 117, 119 in the first data acquired in step S502 can be respectively assigned as the evaluation values Zi (i=1 to 60) for the captured image counts i when j=2.

Also, the data set shown in FIG. 7(C) is an example where j is 4, the time interval T is T×4=0.04 (sec), the captured image count N is 31, and the unit movement angle μ is μ×4 at the time of measurement. Accordingly, the data pieces for the evaluation values Zi (i=1 to 30) for the captured image counts i=1, 5, 9, . . . , 113, 117 in the first data acquired in step S502 can be respectively assigned as the evaluation values Zi for the captured image counts i when j=4. FIG. 7(D) shows a generalized data set for "j".

Step S504: Third Step

In step S504, the second data acquisition unit 412 first sets the movement path P0 for movement of the sensor 1 by the robot 10 (the robot arm 3 thereof), as well as the movement velocity V×k (k being an integer of 2 or more), the time interval T×j/k, and the total movement angle θ as third measurement parameters. In other words, the velocity of the sensor 1 in the third measurement parameters is set to k times the velocity of the sensor 1 in the first measurement parameters, and the time interval of measurement by the sensor 1 in the third measurement parameters is set to 1/k times the time interval of measurement by the sensor 1 in the first measurement parameters. Note that in step S504 as well, instead of actually performing measurement with the third measurement parameters, the basic first data is used in order to estimate an evaluation value Zi indicating the accuracy of workpiece 5 recognition (e.g., the number of recognized workpieces 5) for each captured image number i based on acquiring captured images of the workpieces 5 using the second measurement parameters and performing the same processing as the image processing in step S502. The evaluation value Zi obtained for each captured image number i for each value of j and value of k is associated with the third measurement parameters and stored in the storage unit 43 as the second data.

Here, FIGS. 8 to 10 are diagrams showing examples of the second data in step S504 (third step) in a table format.

The data sets shown in FIGS. 8(A) to 8(D) correspond to FIGS. 7(A) to 7(D) when the velocity V of the sensor 1 is a factor of k=2. The data set shown in FIG. 8(A) is an example where k is 2 and j is 1, and the time interval T is T×1=0.01 (sec), the captured image count N is 60, and the unit movement angle μ is μ×1×2 at the time of measurement. Accordingly, the data pieces for the evaluation values Zi for the captured image counts i=1, 3, 5, . . . , 117, 119 in the first data can be respectively assigned as the evaluation values Zi (i=1 to 60) for the captured image counts i when k=2 and j=1.

The data set shown in FIG. 8(B) is an example where k is 2 and j is 2, and the time interval T is T×2=0.02 (sec), the captured image count N is 30, and the unit movement angle μ is μ×2×2 at the time of measurement. Accordingly, the data pieces for the evaluation values Zi for the captured image counts i=1, 5, 9, . . . , 113, 117 in the first data can be respectively assigned as the evaluation values Zi (i=1 to 30) for the captured image counts i when k=2 and j=2.

The data set shown in FIG. 8(C) is an example where k is 4 and j is 4, and the time interval T is T×4=0.04 (sec), the captured image count N is 15, and the unit movement angle μ is μ×4×2 at the time of measurement. Accordingly, the data pieces for the evaluation values Zi for the captured image counts i=1, 9, 17, . . . , 105, 113 in the first data can be respectively assigned as the evaluation values Zi (i=1 to 15) for the captured image counts i when k=2 and j=4. FIG. 8(D) shows a generalized data set for "k=2" and "j".

The data sets shown in FIGS. 9(A) to 9(D) correspond to FIGS. 7(A) to 7 (D) when the velocity V of the sensor 1 is a factor of k=3. The data set shown in FIG. 9(A) is an example where k is 3 and j is 1, and the time interval T is T×1=0.01 (sec), the captured image count N is 40, and the unit movement angle μ is μ×1×3 at the time of measurement. Accordingly, the data pieces for the evaluation values Zi for the captured image counts i=1, 4, 7, . . . , 115, 118 in the first data can be respectively assigned as the evaluation values Zi (i=1 to 40) for the captured image counts i when k=3 and j=1.

The data set shown in FIG. 9(B) is an example where k is 3 and j is 2, and the time interval T is T×2=0.02 (sec), the captured image count N is 20, and the unit movement angle μ is μ×2×3 at the time of measurement. Accordingly, the data pieces for the evaluation values Zi for the captured image counts i=1, 7, 13, . . . , 115, 121 in the first data can be respectively assigned as the evaluation values Zi (i=1 to 20) for the captured image counts i when k=3 and j=2.

The data set shown in FIG. 9(C) is an example where k is 3 and j is 4, and the time interval T is T×4=0.04 (sec), the captured image count N is 10, and the unit movement angle μ is μ×4×3 at the time of measurement. Accordingly, the data pieces for the evaluation values Zi for the captured image counts i=1, 13, 25, . . . , 97, 109 in the first data can be respectively assigned as the evaluation values Zi (i=1 to 10) for the captured image counts i when k=3 and j=4. FIG. 9(D) shows a generalized data set for "k=3" and "j". Further, the data sets shown in FIGS. 10 (A) to 10(D) are generalized data sets for "k", and in particular, FIG. 10(D) shows a generalized data set for both "k" and "j".

Step S505: Fourth Step

In step S505, the optimization parameter determination unit 414 selects at least one measurement parameter corresponding to data that satisfies a predetermined judgment criterion from among the obtained second data, and for example, the user determines a desired measurement parameter from among the selected measurement parameters as an optimized measurement parameter for use in the actual operation of the robot system 100. Here, FIG. 11 shows a specific example of the second data obtained by experimentally executing steps S501 to S504 using the sensor 1 for 20 hexagon head bolts as the piled workpieces 5 using a robot system 100, in a table format. Note that in FIG. 11, the movement velocity V of the sensor 1 is shown as a percentage (%) of the maximum velocity that can be realized by the robot system 100. Strictly speaking, the "required time H" in the figure is not dependent on only the time interval T and the number of shots N, but rather is shown as a total time including the time for transferring the images captured by the sensor 1 to the control calculation unit 41 (computer) and the time for compositing 3D point cloud data for multiple images, but here, for convenience in the description, the required time H is calculated as time interval T×captured image number i. Further, FIG. 11 shows only data in which the evaluation value $Z_i$, which is the recognized number of workpieces 5, is 17 or higher.

Also, FIG. 12 is a plan view of an example of the data set shown in FIG. 11 in which recognition results (contour lines) are superimposed on images of 20 workpieces 5 captured by the sensor 1. For example, FIG. 12(A) shows the results where velocity V=70%, interval T=0.05 (sec), captured image number i=5, and the number of recognized workpieces 5 (evaluation value $Z_i$) is 19, and "70%_0.05_5_19" shown at the bottom of the figure indicates the conditions and results. Note that the same applies to FIGS. 12(B) to 12(D). Also, in FIG. 12(C), the number of workpieces 5 whose contour lines were recognized in the figure is 17, but it was determined that 18 could be recognized by adjusting the reliability of the recognition result, and therefore the final number of recognized workpieces 5 (evaluation value $Z_i$) was 18. On the other hand, in FIG. 12(D), the number of workpieces 5 whose contour lines were recognized in the figure is 19, but it was determined that 18 could be recognized by adjusting the reliability of the recognition result, and therefore the final number of recognized workpieces 5 (evaluation value $Z_i$) was 18.

In step S505, the predetermined judgment criteria are, for example, that the evaluation value $Z_i$ for the workpieces 5 is higher than or equal to a predetermined evaluation value ZB, and in FIG. 11, the data is sorted in descending order of the evaluation value $Z_i$, and when the evaluation value $Z_i$ is the same, the data is sorted in ascending order of the required time H. For example, a configuration is possible in which if the recognized object count of 19 (recognition rate=19/20=95%) is set as the predetermined evaluation value ZB for judgment, the user can appropriately select a desired measurement parameter from among the measurement parameters that correspond to a data set having the evaluation value $Z_i$=19 in FIG. 11, and determine the selected measurement parameter as the optimized measurement parameter for use in the actual operation of the robot system 100. The above described operations may be similarly applied when the recognized object count of 17 or 18 is set as the predetermined evaluation value ZB for judgment.

Step S506

In step S506, the robot system 100 is actually operated using the optimized measurement parameter that was determined in step S505, and workpiece 5 manipulation processing is performed.

4. ACTIONS AND EFFECTS

As described above, according to the example of the control device 4 of the robot system 100 according to one or more embodiments and the measurement parameter optimization method using the control device 4, recognition results for workpieces 5 for the case of changing measurement parameters to different conditions (second measurement parameters or third measurement parameters) can be estimated based on first data, which is basic data acquired in advance before actual operation of the robot system 100, without performing actual measurement with the changed parameters. Accordingly, it is not necessary to perform pre-measurement for all combinations of conditions that can be envisioned as measurement parameters, and by performing detailed pre-measurement only one time before actual operation, measurement parameters or the sensor 1 can be optimized for each type of workpiece 5 that is envisioned.

Also, even if the robot 10 is changed, if conditions (specifically, the movement velocity V of the sensor 1 and the time interval T) that correspond to the characteristics (mechanical parameters) of the changed robot 10 are included in a parameter set of the first data and the second data acquired in advance for the robot 10 equipped with the sensor 1, measurement parameters for data that satisfies a predetermined judgment criterion can be selected from among the sets of first and second data that satisfy the condition, and be determined to be optimized measurement parameters for use when workpieces 5 are to be manipulated by the new different robot.

Alternatively, if conditions that correspond to the characteristics of the changed robot 10 are included in a parameter set of the first data and the second data, a result obtained under those conditions can be used as basic data (first data) for the new robot 10. By executing processing similar to that in the second to fourth operations (i.e., (2) to (4)) described above using the basic data, it is possible to perform measurement parameter optimization for the robot system 100 that includes the new robot 10 without performing pre-measurement again.

Therefore, according to the present disclosure, measurement parameters for the sensor 1 in a task in which various types of workpieces 5 are manipulated by robot systems 100 that include various robots 10 can be optimized significantly more simply (with less effort, in a shorter time, and without robot dependency, for example) than in conventional technology. Accordingly, robustness during workpiece 5 measurement, the work efficiency of workpiece 5 manipulation, and the overall throughput can be improved, and as a result, user convenience and versatility are significantly improved. Also, as described in step S505, by setting the predetermined recognized object count ZB to a larger value, the robustness can be further improved, which is advantageous when prioritizing improvement of the measurement accuracy.

5. VARIATIONS

Although one or more embodiments have been described in detail above as examples of the present disclosure, the above description is merely an example of the present disclosure in all respects, various improvements and modifications can be made without departing from the scope of the present disclosure, and needless to say, changes such as the following changes can be made. Note that in the following descriptions, the same reference numerals are used for components that are the same as those in one or more embodiments, and the description is omitted as appropriate for points that are similar to one or more embodiments. Moreover, one or more embodiments and the following modifications may be combined and configured as appropriate.

In one or more embodiments, the number recognized workpieces 5 is illustrated as the evaluation value $Z_i$ indicating the accuracy of the recognition of the workpieces 5, but the invention is not so limited. For example, the effective number of three-dimensional point cloud data obtained as a result of the workpiece 5 recognition processing may be used as the evaluation value $Z_i$. Alternatively, the degree of agreement between known three-dimensional information for the workpieces 5 (e.g., three-dimensional CAD (Computer Aided Design) data) and shape information obtained as a result of the workpiece 5 recognition processing may be used as the evaluation value $Z_i$.

In one or more embodiments, the velocity of the sensor 1 in the third measurement parameters is set to k times the velocity of the sensor 1 in the first measurement parameters, and the time interval of the measurement by the sensor 1 in the third measurement parameters is set to 1/k times the time interval of measurement by the sensor 1 in the first measurement parameters, the invention is not so limited. For example, let V1 be the velocity of the sensor 1 in the first measurement parameters, V2 be the velocity of the sensor 1 in the third measurement parameters, T1 be the time interval of measurement by the sensor 1 in the first measurement parameters, and T2 be the time interval for measurement by the sensor 1 in the third measurement parameters. In the above described case, if V2×T2 is an integral multiple of V1×T1, verification results for the first data include verification results for the second data, and therefore the measurement parameter optimizing method according to one or more embodiments may be applied.

In one or more embodiments, it is assumed that V2 and T2 are always constant in the movement path of the sensor 1, but the invention is not so limited. For example, the movement path of the sensor 1 may be divided into a plurality of sections, and V2 and T2 may be constant in each section, or V2 and T2 do not necessarily need to be the same in different sections.

5.1. First Variation

In the first variation, the predetermined determination criterion is that the recognized object count, which is the evaluation value $Z_i$ indicating the accuracy of recognition of the workpieces 5, greater than or equal to the predetermined recognized object count ZB, and the movement velocity V of the sensor 1 is faster. Here, FIG. 13 is a diagram in which the second data illustrated in FIG. 11 is sorted in descending order of evaluation value $Z_i$, and data having the same evaluation value $Z_i$ is sorted in descending order of velocity V. According to FIG. 13, it was confirmed that there are 4 sets of measurement parameters with the recognized object count ZB of 19 and the highest velocity V (80%), there are 6 sets of measurement parameters with the recognized object count ZB of 18 and the highest velocity V (90%), and there is 1 set of measurement parameters with the recognized object count ZB of 17 and the highest velocity V (90%). The optimized measurement parameter can be appropriately selected from among such data according to the desired recognized object count ZB. As described above, if the predetermined determination criterion includes the predetermined recognized object count ZB for the workpieces 5 and furthermore the condition that the velocity V of the sensor 1 is faster, advantages may be realized in giving priority to the velocity V during movement of the sensor 1 while also satisfying the desired recognized object count ZB.

5.2. Second Variation

In the second variation, the predetermined determination criterion is that the recognized object count, which is the evaluation value $Z_i$ indicating the accuracy of recognition of the workpieces 5, is greater than or equal to the predetermined recognized object count ZB, and that the captured image number i of the workpieces 5 is lower. Here, FIG. 14 is a diagram in which the second data illustrated in FIG. 11 is sorted in descending order of the recognized object count $Z_i$, and data having the same recognized object count $Z_i$ is sorted in ascending order of the captured image number i. According to FIG. 14, in the measurement parameters having the recognized object count ZB of 19 and the lowest captured image number i (4), the velocity V of the sensor 1 is 70%, the time interval T is 0.06 sec, and the captured image number i is 4, and these can be determined to be optimized parameters. Also, in FIG. 14, it was confirmed that there are 6 sets of measurement parameters with the recognized object count ZB of 18 and the lowest captured image count i (4), and there are 4 sets of measurement parameters with the recognized object count ZB of 17 and the lowest captured image count i (3). As described above, if the predetermined determination criterion includes the predetermined recognized object count ZB for the workpieces 5 and furthermore the condition that the captured image number i is lower, advantages may be realized in giving priority to lowering the captured image number i while also satisfying the desired recognized object count ZB.

5.3. Third Variation

In the third variation, the sensor 1 captures images of a plurality of workpieces 5 a plurality of times using the first measurement parameters, and the average value of the recognized object counts $Z_i$ for the various captured image counts i is stored in association with the first measurement parameters as the first data. In the present case, the position/orientation of the sensor 1, the movement path P0 of the sensor 1, the piled state of the workpieces 5, and the like may be randomly changed. Here, FIG. 15 is a flowchart showing an example of the processing procedure in the third variation.

Figure 15:
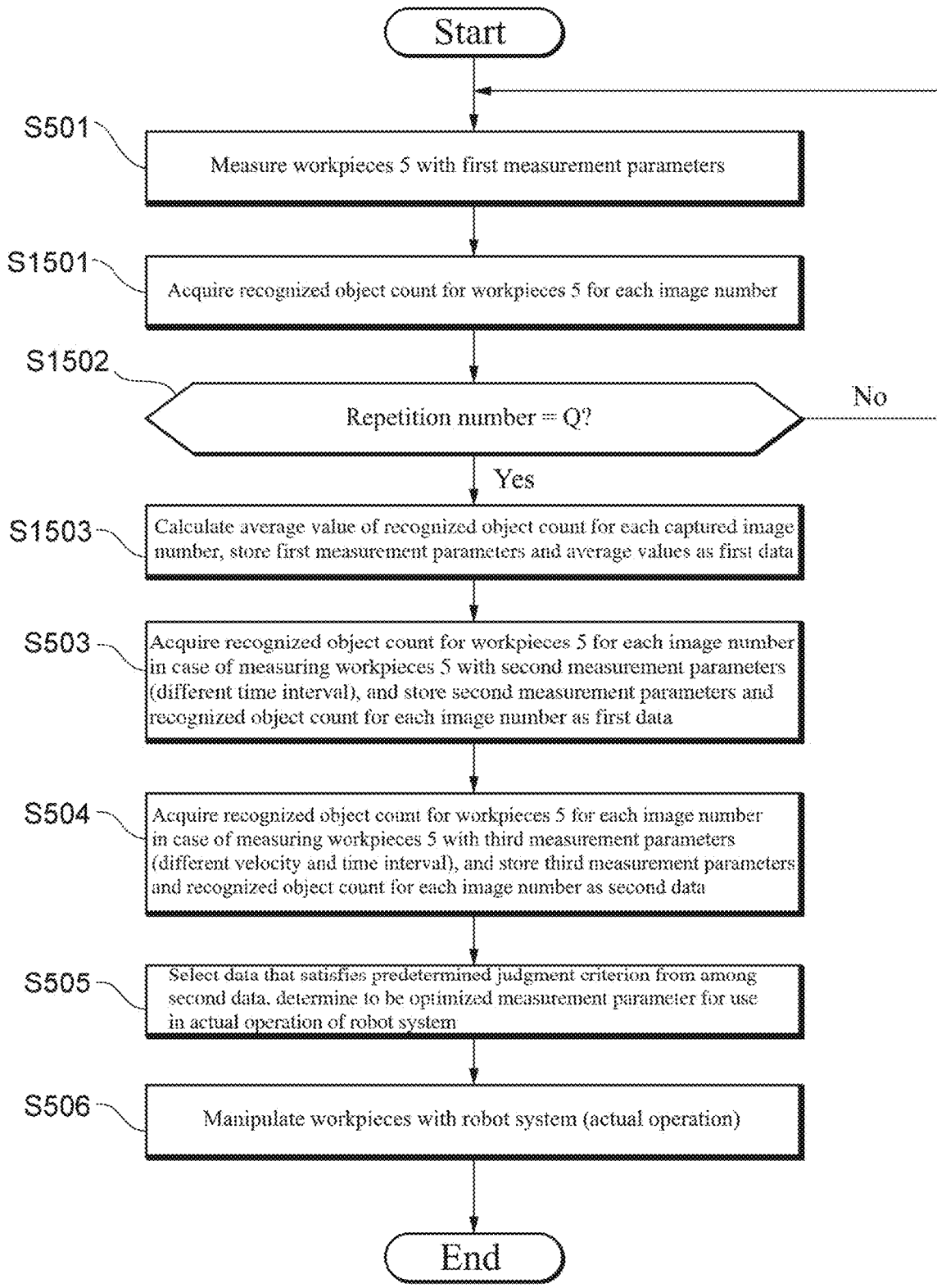
FIG. 15 is a diagram illustrating a flowchart of an example of a processing procedure in a third variation.

Specifically, as shown in FIG. 15, the processing in the third variation is the same as that of the processing procedure in the operation example shown in FIG. 5, except that steps S1501 to S1503 are performed instead of step S502. In step S1501, similarly to step S502 (second step (1)), image processing is performed using the N captured images, and the recognized object count $Z_i$ for the workpieces 5 is acquired for each captured image number i, but the processing of storing the recognized object count $Z_i$ in association with the first measurement parameters is not performed yet. Next, in step S1502, if a preset number of repetitions Q of step S501 has not been reached (step S1502 is "No"), step S501 is repeated, and the recognized object count $Z_i$ for the workpieces 5 is acquired for each captured image number i in processing performed Q times. In other words, Q pieces of data on the recognized object count $Z_i$ is acquired for each captured image count. If the number of repetitions of step S501 has reached Q (step S1502 is "yes"), the processing proceeds to step S1503, the average value of the Q pieces of data on the recognized object count Zi is calculated, and the average value is stored in association with the first measurement parameters in the storage unit 43 as the first data.

According to the third variation, the accuracy and reliability of the first data obtained experimentally can be improved, and as a result, it is possible to further improve the robustness at the time of measuring the workpieces 5, the work efficiency in manipulation of the workpieces 5, and the overall throughput.

5.4. Fourth Variation

The fourth variation describes an example of a method in which, as described in section "4. Actions and effects" for the operation example, when the robot 10 of the robot system 100 is changed, an optimized measurement parameter in the robot system 100 after the robot 10 has changed is obtained by utilizing the first data and the second data that have been obtained in advance for a robot 10 equipped with the sensor 1. Specifically, for example, if conditions (specifically, the movement velocity V of the sensor 1 and the time interval T) that correspond to the characteristics (mechanical parameters) of the changed robot 10 are included in a parameter set of the first data and the second data in the operation example, measurement parameters for data that satisfies a predetermined judgment criterion can be selected from among the sets of first and second data that satisfy the conditions, and can be determined to be optimized measurement parameters for use when workpieces 5 are to be manipulated by the different robot after the change. Therefore, it becomes possible to provide a simple method that can realize the optimization of a measurement parameter without dependency on the robot 10.

5.5. Fifth Variation

The fifth variation also describes an example of a method in which, as described in section "4. Actions and effects" for the operation example, when the robot 10 of the robot system 100 is changed, an optimized measurement parameter in the robot system 100 after the robot 10 has changed is obtained by utilizing the first data and the second data that have been obtained in advance for a robot 10 equipped with the sensor 1. In other words, for example, if conditions that correspond to the characteristics of the changed robot 10 are included in a parameter set of the first data and the second data in the operation example, results under such conditions can be utilized as basic data (first data) for the changed robot 10. By executing processing similar to that in the second to fourth operations (i.e., (2) to (4)) described above using the basic data, it is possible to perform measurement parameter optimization for the robot system 100 that includes the new robot 10 without performing pre-measurement again. Even with the above described configuration, it is possible to provide a simple method that can realize the optimization of a measurement parameter without dependency on the robot 10.

5.6. Sixth Variation

Figure 16A:
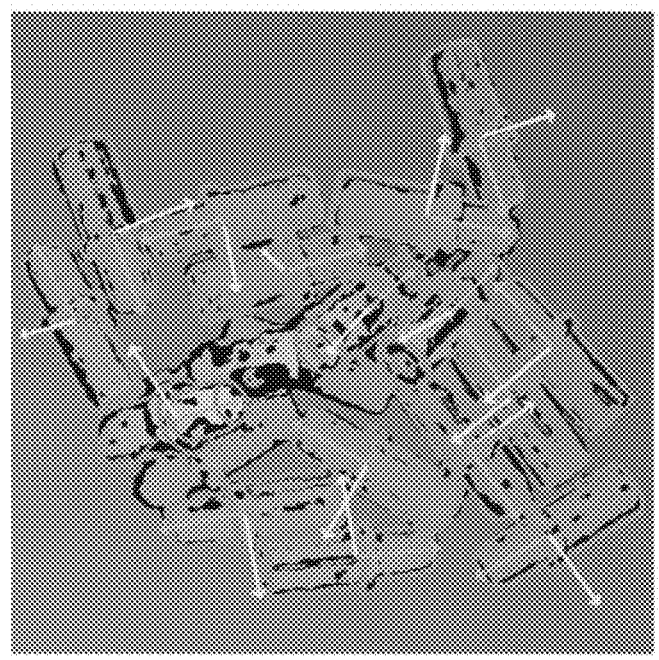
FIGS. 16A, 16B, and 16C are diagrams each illustrating a plan view in which a plurality of workpieces 5 having different shapes are measured, and recognition results (contour lines) that were obtained by image processing and indicate positions and orientations of workpieces 5 by image processing are superimposed on a captured image of a workpieces 5.
Figure 16B:
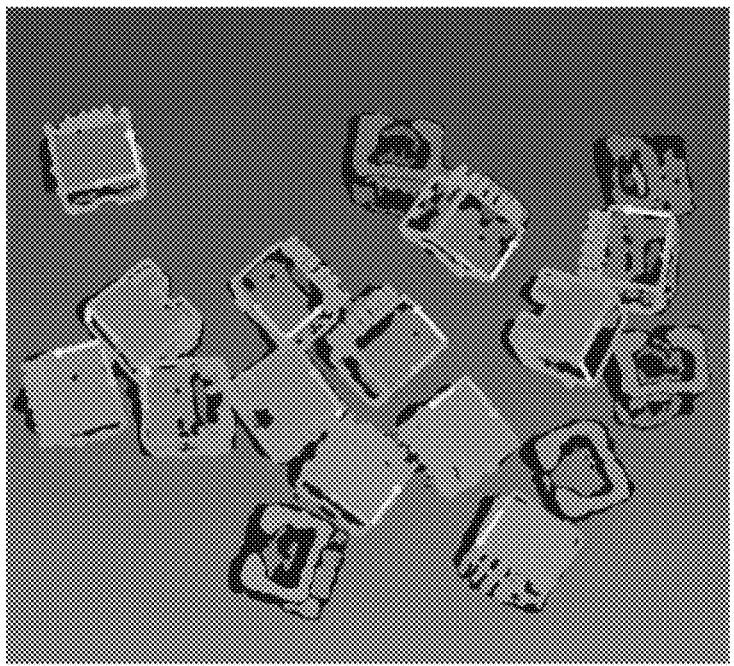
Figure 16C:
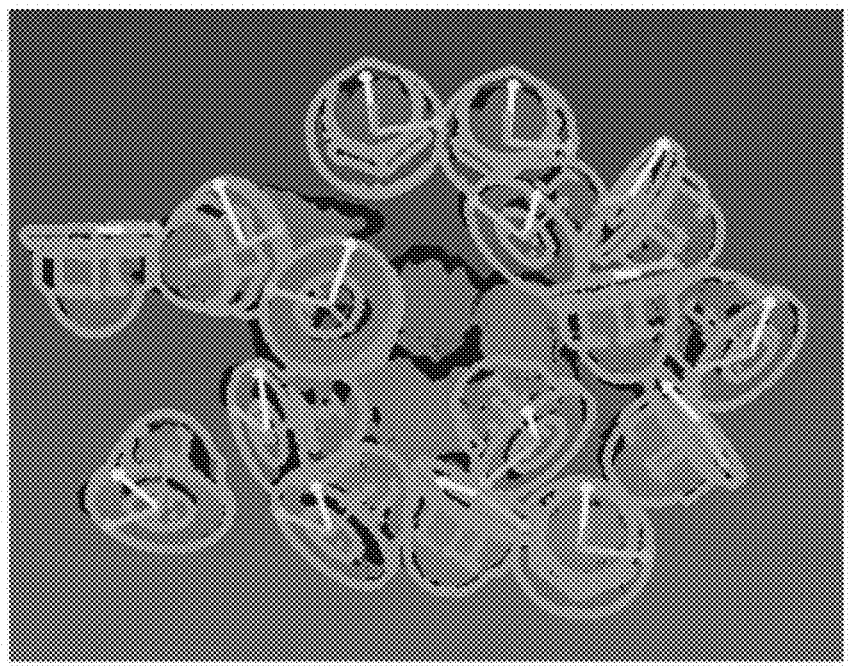

Further, as a sixth variation, FIG. 16 is a plan view in which a plurality of workpieces 5 having a shape different from that of a hexagon head bolt are measured, and the recognition results (contour lines) of the positions and orientations of the workpieces 5 obtained by image processing are superimposed on a captured image. Accordingly, even in the case of various types of workpieces 5, by applying the measurement parameter optimization method according to the present disclosure, it is possible to improve versatility in optimizing measurement parameters for various types of workpieces 5.

6. APPENDIX

One or more embodiments and modifications described above are for facilitating the understanding of the invention, and are not intended to limit the interpretation thereof. The included constituent elements and the arrangements, materials, conditions, shapes, sizes, and the like thereof in one or more embodiments and variations are not limited to those in the given examples, and can be changed as appropriate. It may also be possible to replace or combine portions of the configurations shown in different embodiments and modifications.

The invention claimed is:

1. A measurement parameter optimization method for use in response to one or more objects being measured by a measuring device provided on a robot, the method comprising:
   (i) acquiring N (N greater than 1) captured images of the one or more objects while causing the measuring device to move with a velocity V, a time interval T, and a total movement angle $\theta$ as first measurement parameters;
   (ii) in response to acquiring N/j (where j is an integer greater than or equal to 1) captured images of the one or more objects while causing the measuring device to move at the velocity V, a time interval T×j, and the total movement angle $\theta$ as second measurement parameters and performing first image processing for recognizing positions and orientations of the one or more objects, estimating an evaluation value Zi indicating an accuracy of recognition of the one or more objects for each captured image number i (where i=1, 2, . . . , N/j−1, N/j) and storing the evaluation values Zi in association with the second measurement parameters as first data;
   (iii) in response to acquiring (N/j)/k (where k is an integer greater than or equal to 2) captured images of the one or more objects while causing the measuring device to move at a velocity V×k, a time interval T×j/k, and the total movement angle $\theta$ as third measurement parameters and performing second image processing for recognizing positions and orientations of the one or more objects, estimating the evaluation value Zi indicating an accuracy of recognition of the one or more objects for each captured image number i (where i=1, 2, . . . , ((N/j)/k)−1, (N/j)/k) based on the first data, and storing the evaluation values Zi in association with the third measurement parameters as second data; and
   (iv) selecting a measurement parameter corresponding to data that satisfies a predetermined judgment criterion from among the second data, and determining the selected measurement parameter to be an optimized measurement parameter for use in response to the one or more objects being manipulated by the robot.

2. The method according to claim 1,
wherein the predetermined judgment criterion includes a condition that the evaluation value Zi regarding the one or more objects is greater than or equal to an evaluation value that has been set in advance.

3. The method according to claim 2,
wherein the predetermined judgment criterion comprises a condition that a required time for the measurement is short.

4. The method according to claim 3,
wherein the predetermined judgment criterion comprises a condition that the movement velocity V of the measuring device is fast.

5. The method according to claim 3,
wherein the predetermined judgment criterion is that the captured image number i regarding the one or more objects is low.

6. The method according to claim 3,
wherein processing for capturing images of the one or more objects with the second measurement parameters is performed a plurality of times, and average values of the evaluation values Zi acquired each time are stored as the first data.

7. The method according to claim 3,
wherein in response to data corresponding to measurement parameters corresponding to the velocity V and the time interval T being obtained according to a characteristic of a different robot different from the robot upon which the first data or the second data is based, a measurement parameter in data that satisfies a predetermined judgment criterion is selected from among the first data and the second data and determined to be an optimized measurement parameter for use in response to the plurality of objects are to be manipulated by the different robot.

8. The method according to claim 2,
wherein the predetermined judgment criterion comprises a condition that the movement velocity V of the measuring device is fast.

9. The method according to claim 8,
wherein the predetermined judgment criterion is that the captured image number i regarding the one or more objects is low.

10. The method according to claim 8,
wherein processing for capturing images of the one or more objects with the second measurement parameters is performed a plurality of times, and average values of the evaluation values Zi acquired each time are stored as the first data.

11. The method according to claim 8,
wherein in response to data corresponding to measurement parameters corresponding to the velocity V and the time interval T obtained according to a characteristic of a different robot different from the robot upon which the first data or the second data is based, a measurement parameter in data that satisfies a predetermined judgment criterion is selected from among the first data and the second data and determined to be an optimized measurement parameter for use in response to the plurality of objects are to be manipulated by the different robot.

12. The method according to claim 2,
wherein the predetermined judgment criterion is that the captured image number i regarding the one or more objects is low.

13. The method according to claim 12,
wherein processing for capturing images of the one or more objects with the second measurement parameters is performed a plurality of times, and average values of the evaluation values Zi acquired each time are stored as the first data.

14. The method according to claim 2,
wherein processing for capturing images of the one or more objects with the second measurement parameters is performed a plurality of times, and average values of the evaluation values Zi acquired each time are stored as the first data.

15. The method according to claim 2,
wherein in response to data corresponding to measurement parameters corresponding to the velocity V and the time interval T being obtained according to a characteristic of a different robot different from the robot being upon which the first data or the second data is based, a measurement parameter in data that satisfies a predetermined judgment criterion is selected from among the first data and the second data and determined to be an optimized measurement parameter for use in response to the plurality of objects are to be manipulated by the different robot.

16. The method according to claim 1,
wherein processing for capturing images of the one or more objects with the second measurement parameters is performed a plurality of times, and average values of the evaluation values Zi acquired each time are stored as the first data.

17. The method according to claim 1,
wherein in response to data corresponding to measurement parameters corresponding to the velocity V and the time interval T acquired according to a characteristic of a different robot different from the robot upon which the first data or the second data is based, a measurement parameter in data that satisfies a predetermined judgment criterion is selected from among the first data and the second data and determined to be an optimized measurement parameter for use in response to the plurality of objects are to be manipulated by the different robot.

18. The method according to claim 1,
wherein, in response to data corresponding to measurement parameters corresponding to the velocity V and the time interval T being obtained according to a characteristic of a different robot different from the robot upon which the first data or the second data is based, data associated with a measurement parameter in the corresponding data is used as new first data, operations (ii) to (iv) are performed to obtain new second data, and a measurement parameter in data that satisfies a predetermined judgment criterion is selected from among the new second data and determined to be an optimized measurement parameter for use in response to the plurality of objects being to be manipulated by the different robot.

19. A measurement parameter optimization device for use when one or more objects are measured by a measuring device provided on a robot, the measurement parameter optimization device including at least one processor configured to perform operations comprising:
acquiring N (N being greater than 1) captured images of the one or more objects while causing the measuring device to move with a velocity V, a time interval T, and a total movement angle θ as first measurement parameters;
based on acquiring N/j (j being an integer greater than or equal to 1) captured images of the one or more objects while causing the measuring device to move at the velocity V, a time interval T×j, and the total movement angle θ as second measurement parameters and performing image processing for recognizing positions and orientations of the one or more objects, estimating an evaluation value Zi indicating an accuracy of recognition of the one or more objects for each captured image number i (here, i=1, 2, . . . , N/j−1, N/j) and storing the evaluation values Zi in association with the second measurement parameters as first data;
based on acquiring (N/j)/k (k being an integer greater than or equal to 2) captured images of the one or more objects while causing the measuring device to move at a velocity V×k, a time interval T×j/k, and the total movement angle θ as third measurement parameters and performing processing similar to the image processing in the second step, estimating the evaluation value $Z_i$ indicating an accuracy of recognition of the one or more objects for each captured image number i (here, i=1, 2, ..., ((N/j)/k)−1, (N/j)/k) based on the first data and storing the evaluation values $Z_i$ in association with the third measurement parameters as second data; and selecting a measurement parameter corresponding to data that satisfies a predetermined judgment criterion from among the second data, and determining the selected measurement parameter to be an optimized measurement parameter for use in response to the one or more objects being manipulated by the robot.

20. A non-transitory computer-readable storage medium storing a program for performing measurement parameter optimization for when one or more objects are measured by a measuring device provided on a robot, the program, which when read and executed, causes at least one processor to execute operations comprising:

acquiring N (N being greater than 1) captured images of the one or more objects while causing the measuring device to move with a velocity V, a time interval T, and a total movement angle θ as first measurement parameters;

based on acquiring N/j (j being an integer greater than or equal to 1) captured images of the one or more objects while causing the measuring device to move at the velocity V, a time interval T×j, and the total movement angle θ as second measurement parameters and performing image processing for recognizing positions and orientations of the one or more objects, estimating an evaluation value $Z_i$ indicating an accuracy of recognition of the one or more objects for each captured image number i (here, i=1, 2, ..., N/j−1, N/j) and storing the evaluation values $Z_i$ in association with the second measurement parameters as first data;

based on acquiring (N/j)/k (k being an integer greater than or equal to 2) captured images of the one or more objects while causing the measuring device to move at a velocity V×k, a time interval T×j/k, and the total movement angle θ as third measurement parameters and performing processing similar to the image processing in the second step, estimating the evaluation value $Z_i$ indicating an accuracy of recognition of the one or more objects for each captured image number i (here, i=1, 2, ..., ((N/j)/k)−1, (N/j)/k) based on the first data and storing the evaluation values $Z_i$ in association with the third measurement parameters as second data; and selecting a measurement parameter corresponding to data that satisfies a predetermined judgment criterion from among the second data, and determining the selected measurement parameter to be an optimized measurement parameter for use in response to the one or more objects are manipulated by the robot.

* * * * *